US008265509B2

(12) United States Patent
Sekiya

(10) Patent No.: US 8,265,509 B2
(45) Date of Patent: Sep. 11, 2012

(54) CONTROL APPARATUS AND METHOD FOR INTERACTING WITH AND CONTROLLING VIA A NETWORK AUTHENTICATION INFORMATION REQUIRED FOR IMAGE PROCESSING BY AN IMAGING DEVICE AND COMPUTER-READABLE STORAGE MEDIUM STORING PROGRAM FOR CAUSING COMPUTER TO FUNCTION AS THE CONTROL APPARATUS

(75) Inventor: Makoto Sekiya, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1190 days.

(21) Appl. No.: 12/082,377

(22) Filed: Apr. 9, 2008

(65) Prior Publication Data

US 2008/0256459 A1   Oct. 16, 2008

(30) Foreign Application Priority Data

Apr. 10, 2007   (JP) .................................. 2007-103321

(51) Int. Cl.
*G03G 15/00* (2006.01)
(52) U.S. Cl. .......... 399/80; 713/186; 713/175; 713/156; 713/193; 713/161; 726/16; 726/19; 726/27; 399/81; 399/75; 358/1.15; 358/1.14; 380/270; 705/51; 709/206; 326/30
(58) Field of Classification Search ....................... 726/6
See application file for complete search history.

(56) References Cited

U.S. PATENT DOCUMENTS

| | | | | |
|---|---|---|---|---|
| 2002/0122203 | A1* | 9/2002 | Matsuda | 358/1.15 |
| 2004/0258429 | A1* | 12/2004 | Moroi | 399/80 |
| 2005/0094195 | A1 | 5/2005 | Sakamoto et al. | |
| 2006/0230286 | A1* | 10/2006 | Kitada | 713/186 |
| 2007/0136804 | A1 | 6/2007 | Ohsawa et al. | |

FOREIGN PATENT DOCUMENTS

| | | |
|---|---|---|
| JP | 2003-132022 A | 5/2003 |
| JP | 2005-026815 A | 1/2005 |
| JP | 2006-268106 A | 10/2006 |
| JP | 2007-010852 A | 1/2007 |

* cited by examiner

*Primary Examiner* — Nathan Flynn
*Assistant Examiner* — Bryan Wright
(74) *Attorney, Agent, or Firm* — Edwards Wildman Palmer LLP; David G. Conlin; David A. Tucker

(57) ABSTRACT

A multifunctional apparatus control system includes a multifunctional apparatus an authentication information input device, an I/F converter, and a control server. The control server includes: a UI control section which transmits, to the multifunctional apparatus over a network, data of authentication screen which prompts the user to make preparations for causing the authentication information input device to acquire authentication information; an authentication information input device driver which controls the operation of the authentication information input device over the network and receives, over the network, the authentication information that the authentication information input device has acquired; an authenticating section which performs authentication based on the authentication information that the authentication information input device driver has received; and a device control section which permits the multifunctional apparatus to execute the job, in accordance with the authentication result of the authenticating section. This arrangement makes it possible to construct a flexible authentication system.

15 Claims, 31 Drawing Sheets

FIG. 9

| IP ADDRESS OF MULTIFUNCTIONAL APPARATUS | IDENTIFICATION INFORMATION FOR IDENTIFYING AUTHENTICATION INFORMATION INPUT DEVICE |
|---|---|
| 192.168.0.20 (IP ADDRESS OF MULTIFUNCTIONAL APPARATUS 1a) | INPUT DEVICE 7a |
| 192.168.0.21 (IP ADDRESS OF MULTIFUNCTIONAL APPARATUS 1b) | INPUT DEVICE 7b |
| ... | ... |
|  |  |

FIG. 10

| ID | IP ADDRESS OF I/F CONVERTER | IDENTIFICATION INFORMATION FOR IDENTIFYING AUTHENTICATION INFORMATION INPUT DEVICE | IDENTIFICATION INFORMATION FOR IDENTIFYING CORRESPONDING DRIVER |
|---|---|---|---|
| 1 | 192.168.0.10 (IP ADDRESS OF I/F CONVERTER 8a) | INPUT DEVICE 7a | IC CARD READER DRIVER |
| 2 | 192.168.0.11 (IP ADDRESS OF I/F CONVERTER 8b) | INPUT DEVICE 7b | FINGERPRINT AUTHENTICATION DEVICE DRIVER |
| 3 | ... | ... | ... |
| ... | | | |

FIG. 14

```
<html>
  <body>
    <form class="authenticate" action="sampe.asp">
      <ul title='Scan to settings'>
        <li>Please insert an ID card into IC</li>
        <li>card reader.</li>
        <li></li>
        <li>Please input a password.</li>
        <li title='password'>
          <input id='input1' readonly="true" format="password" />
        </li>
      </ul>
      <input id="id_ok" value="OK"/>
      <input id="id_cancel" value="Cancel"/>
    </form>
  </body>
</html>
```

FIG. 15

```
<html>
 <body>
  <form class="message" action="sampe.asp">
   <p>Insert your middle finger into the</p>
   <p>fingerprint reader.</p>
   <input id="id_ok" value="OK"/>
   <input id="id_cancel" value="Cancel"/>
  </form>
 </body>
</html>
```

FIG. 16

| USER ID | PASSWORD | AUTHORITY |
|---------|----------|-----------|
| 100001 | Afdjaoijs | COPY, PRINT, FAX |
| 100002 | Nczmxbz | PRINT, SCAN |
| 100003 | Qwiueytq | COPY |
| ... | | |

Authentication ends up in failure.
Please insert a correct ID card.

Authentication has successfully been done.
The following functions are available.
Please select a function to be used.

| COPY | PRINT |
| FAX | |
| | OK |

FIG. 22

| IP ADDRESS OF AUTHENTICATION SERVER | IDENTIFICATION INFORMATION FOR IDENTIFYING AUTHENTICATION INFORMATION INPUT DEVICE |
|---|---|
| 192.168.0.30 (IP ADDRESS OF AUTHENTICATION SERVER 4a) | INPUT DEVICE 7a |
| 192.168.0.31 (IP ADDRESS OF AUTHENTICATION SERVER 4b) | INPUT DEVICE 7b |
| ... | ... |
| | |

FIG. 24

| USER ID | PASSWORD | AUTHORITY | |
| --- | --- | --- | --- |
| | | MULTIFUNCTIONAL APPARATUS | JOB |
| 100001 | Afdjaoijs | 192.168.0.20<br>192.168.0.21 | COPY, PRINT, FAX |
| 100002 | Nczmxbz | 192.168.0.21 | PRINT, SCAN |
| 100003 | Qwiueytq | 192.168.0.20 | COPY |
| ... | | | |

FIG. 25

| CONTROL CONTENT | CONTROL INSTRUCTION (IN ORDER OF INVOCATION) | | | |
| --- | --- | --- | --- | --- |
| | FIRST | SECOND | THIRD | FOURTH |
| SCAN | JobCreate | ExecuteScan | JobClose | ... |
| ... | ... | ... | ... | ... |

FIG. 29

```
<html>
<body>
<form class="osa_menu" title="THIS IS TITLE" action="next_page.aspx ">   ···SECTION (A)
  <input id="id_ok"/>                    ⎫
  <input id="id_cancel"/>                ⎬ ···SECTION (B)
  <input id="id_prev"/>                  ⎪
  <input id="id_exit"/>                  ⎭
  <fieldset title="THIS IS PROMPT TEXT">    ···SECTION (C)
    <input id="btn1" type="submit" title="BUTTON1" />    ⎫
    <input id="btn2" type="submit" title="BUTTON2" />    ⎪
    <input id="btn3" type="submit" title="BUTTON3" />    ⎪
    <input id="btn4" type="submit" title="BUTTON4" />    ⎪
    <input id="btn5" type="submit" title="BUTTON5" />    ⎬ ···SECTION (D)
    <input id="btn6" type="submit" title="BUTTON6" />    ⎪
    <input id="btn7" type="checkbox" title="BUTTON7" selected='true'/>   ⎪
    <input id="btn8" type="checkbox"'submit" title="BUTTON8" />          ⎭
  </fieldset>
</form>
</body>
</html>
```

FIG. 30

MENU FORM (DESIGNATED BY class="osa_menu")

| PART INFORMATION | FORMAT TO BE DISPLAYED ON OPERATION SCREEN |
|---|---|
| Title | \<text x='5' y='2' x2='50' y2='8' >THIS IS TITLE\<text> |
| \<input id="id_ok"/> | \<button x='130' y='2' x2='145' y2='8' >OK\<text> |
| \<input id="id_cancel"/> | \<button x='110' y='2' x2='135' y2='8' >CANCEL\<text> |
| \<input id="id_prev"/> | \<button x='90' y='2' x2='105' y2='8' >BACK \<text> |
| \<input id="id_exit"/> | \<button x='70' y='2' x2='85' y2='8' >EXIT\<text> |
|  | \<line x='10' y='15' x2='140' y2='10' > |
| title="THIS IS PROMPT TEXT" | \<text x='5' y='12' x2='20' y2='18'>THIS IS TITLE\<text> |
| \<input id="btn1" BUTTON1 type="submit" | \<text x='20' y='22' x2='65' y2='26'>BUTTON1\<text> |
| ... | ... |

CONTROL APPARATUS AND METHOD FOR INTERACTING WITH AND CONTROLLING VIA A NETWORK AUTHENTICATION INFORMATION REQUIRED FOR IMAGE PROCESSING BY AN IMAGING DEVICE AND COMPUTER-READABLE STORAGE MEDIUM STORING PROGRAM FOR CAUSING COMPUTER TO FUNCTION AS THE CONTROL APPARATUS

This Nonprovisional application claims priority under 35 U.S.C. §119(a) on Patent Application No. 103321/2007 filed in Japan on Apr. 10, 2007, the entire contents of which are hereby incorporated by reference.

FIELD OF THE INVENTION

The present invention relates to an imaging apparatus which is provided with a display section and executes at least one of an image formation job and an image processing job, the execution of the job being allowed in accordance with a result of authentication based on authentication information that an authentication information acquisition device acquires from the user. The present invention also relates to a control apparatus which can perform communications over a network.

BACKGROUND OF THE INVENTION

Among various apparatuses such as multifunctional apparatuses, there is a multifunctional apparatus that, in order to limit its use by an unintended user such as an outsider, authenticates a user and does not become usable until authentication is completed successfully. In order to authenticate a user, such a multifunctional apparatus is provided with an authentication information input device for acquiring authentication information such as an ID and a password from a user. Authentication information acquired by the authentication information input device is compared with pre-registered authentication information held on a user account database. Authentication is completed successfully when the authentication information matches the pre-registered authentication information, and authentication ends up in failure when the authentication information does not match the pre-registered authentication information.

Below-mentioned Patent Documents 1 and 2 disclose such authentication systems as described above. Patent Document 1 proposes to authenticate a user by comparing one's fingerprint information with fingerprint information held on a database together with an ID and a password. The user's fingerprint information is obtained by putting, in a numerical form, the user's fingerprint read with a fingerprint reader incorporated into a cash dispenser. In order for the user to enjoy various services with a single ID and a single password, Patent Document 1 further proposes to authenticate the user with use of a single ID and a single password, and to authenticate the user for each service with use of an ID and a password, acquired from the data base in cases where authentication is completed successfully, which are necessary for authentication unique to that service.

Further, Patent Document 2 proposes to acquire authentication data from a user with use of a numeric keypad provided in a multifunctional apparatus, and to permit or prohibit the use of the multifunctional apparatus in accordance with a result of authentication of the user.

(Patent Document 1) Japanese Unexamined Patent Publication No. 2003-132022 (published on May 9, 2003)

(Patent Document 2) Japanese Unexamined Patent Publication No. 2005-141313 (published on Jun. 2, 2005)

However, the conventional techniques have a problem with their inability to build a flexible authentication system.

Currently, there exist various user authentication systems. Examples of the user authentication systems include a user authentication system to which an ID and a password are inputted, a user authentication system that uses a magnetic card or an IC card, and a user authentication system that uses a physical characteristic such as a fingerprint, a vein, or an iris. Therefore provided in accordance with the types of authentication system are various types of authentication information input device for acquiring authentication information from a user.

However, according to the conventional techniques, an authentication information input device is incorporated into a cash dispenser or a multifunctional apparatus, and a shift to another authentication system is impossible because the authentication information input device is not exchangeable.

Further, even if the authentication information input device is designed to be replaced by another authentication information input device, a shift to another device makes it necessary to also shift to a device driver program for controlling the operation of the device. In order to introduce a new device driver program to a system into which a cash dispenser or a multifunctional apparatus has been incorporated, it is usually necessary to disassemble the apparatus and exchange substrates and ROMs (Read-only memories). This requires time and cost. Such a problem also occurs, for example, in cases where the data format of an IC card has been changed.

Furthermore, such an apparatus often uses a special operating system dedicated to an embedded system. This makes it necessary to develop a driver program for each special operating system installed in an individual apparatus.

Such a problem is not unique to the device driver program. To allow a user to properly insert an IC card or to set one's finger in accordance with the type of authentication information input device, it is necessary to display an authentication screen showing a message such as "insert the IC card" and "set your middle finger". Since the type of message must be changed in accordance with the type of authentication information input device, it is necessary to disassemble the apparatus which is a cash dispenser, a multifunctional apparatus, or the like, and replace a substrate or ROM (Read Only Memory) therein, in order to change the data for the authentication screen.

SUMMARY OF THE INVENTION

An object of the present invention to provide an imaging apparatus control system capable of developing a flexible authentication system and a control apparatus for use in the imaging apparatus control system.

To achieve the object above, a control apparatus of the present invention, which is able to communicate over a network with an imaging apparatus which includes a display section and executes a job including at least one of an image formation job and an image processing job, whether the imaging apparatus is permitted to execute the job being determined in accordance with an authentication result based on first authentication information that an authentication information acquisition device acquires from a user, includes: authentication screen transmitting means for transmitting, to the imaging apparatus over the network, data of an authentication screen which is displayed on the display section of the imaging apparatus and which prompts the user to make preparations to cause the authentication information acquisition device to acquire the first authentication information; device driver means for controlling the authentication information acquisition device over the network, so as to cause the authentication information acquisition device to acquire the first authentication information; authentication information receiving means for receiving, over the network, the first authentication information that the authentication information acquisition device has acquired; and permitting means for permitting the imaging apparatus to execute the job, in accordance with the authentication result based on the first authentication information that the authentication information receiving means has received.

Also, a control method of the present invention, for controlling, by a control apparatus over a network, (i) an authentication information acquisition device which acquires from a user first authentication information required for authentication and (ii) an imaging apparatus which includes a display section and executes a job including at least one of an image formation job and an image processing job, whether the imaging apparatus is permitted to execute the job being determined in accordance with an authentication result based on the first authentication information that the authentication information acquisition device acquires from the user, includes the steps of: (1) transmitting, by authentication screen transmitting means of the control apparatus, data of an authentication screen which is displayed on the display section of the imaging apparatus and which prompts the user to make preparations to cause the authentication information acquisition device to acquire the first authentication information, to the imaging apparatus over the network; (2) controlling, by device driver means of the control apparatus, the authentication information acquisition device over the network, so as to cause the authentication information acquisition device to acquire the first authentication information; (3) receiving over the network, by authentication information receiving means of the control apparatus, the first authentication information that the authentication information acquisition device has acquired; and (4) permitting, by permitting means of the control apparatus, the imaging apparatus to execute the job, in accordance with the authentication result based on the first authentication information that has been received in the step (3).

An imaging apparatus control system of the present invention includes the aforesaid imaging apparatus, the aforesaid authentication information acquisition device, and the aforesaid control apparatus.

It is noted that the aforesaid imaging apparatus and the aforesaid authentication information acquisition device may not communicate each other. Also, the aforesaid authentication information acquisition device may be connected to the imaging apparatus and exchange information with the control apparatus via the imaging apparatus.

Examples of the "image formation" include printing. Further, examples of the "image processing" include scanning of a document, facsimile, PC facsimile, image conversion, and image correction. Therefore, examples of the "imaging apparatus" include a printer, a copier, a facsimile machine, a PC facsimile machine, an image analysis apparatus, an image correction apparatus, a scanner, and a multifunctional apparatus.

According to the foregoing arrangement, the operation control means of the control apparatus controls the operation of the imaging apparatus via the network. Therefore, the imaging apparatus and the control apparatus that controls the operation of the imaging apparatus can be disposed in separate places. Meanwhile, the operation of the authentication information acquisition device is not controlled by the imaging apparatus as has conventionally been done, but is controlled by the device driver means of the control apparatus. In this way, the operation of the authentication information acquisition device is controlled by the control apparatus separate from the imaging apparatus which is designed to process a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

Furthermore, in cases where the authentication information acquisition device is connected to the control apparatus via a non-network manner such as USB thereby being controlled by the control apparatus, the control apparatus and the authentication information acquisition device must be located within a predetermined distance because of the constraints of the length of the cable, and hence the layout of the apparatuses is limited. On the other hand, in the arrangement above, since the authentication information acquisition device is controlled over the network, it is possible to arrange the control apparatus and the authentication information acquisition device to be remote from each other. This increases the freedom for the layout of apparatuses.

Furthermore, in the arrangement above, the data of the authentication screen us supplied from the authentication screen transmitting means of the control apparatus to the imaging apparatus, and the authentication screen corresponding to the data is displayed on the display section of the imaging apparatus. This authentication screen prompts the user to make preparations for causing the authentication information acquisition device to acquire the first authentication information. Therefore the user who sees the authentication screen displayed on the display section of the imaging apparatus notices that it is necessary to make preparations for causing the authentication information acquisition device to acquire the first authentication information, and hence makes the preparations. Therefore, even when the authentication information input device is not provided with a display section, it is possible to prompt the user to perform the preparations for authentication, by using the display section of the imaging apparatus. This makes it possible to construct a user-friendly authentication system. Moreover, when it is necessary to change the authentication screen because of an alternation in the arrangement of the authentication information acquisition device, it is unnecessary to replace a substrate or ROM of the imaging apparatus, because the data of the authentication screen is supplied from the control server. This further ensures the construction of a flexible authentication system.

Preferably, the authentication screen is arranged to not only prompt the user to make preparations but also explain in what manner the preparations are made. With this, the user can make preparations without confusion or doubt, irrespective of the type of the authentication information acquisition device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9 relates to an embodiment of the present invention and shows an example of a first correspondence table showing a correspondence relationship between a multifunctional apparatus and an authentication information input device.

FIG. 10 relates to an embodiment of the present invention and shows an example of a second correspondence table indicating a correspondence relationship among an I/F converter, an authentication information input device, and a device driver program.

FIG. 14 relates to an embodiment of the present invention, and shows data on the authentication screen of FIG. 12.

FIG. 15 relates to an embodiment of the present invention, and shows data on the authentication screen of FIG. 13.

FIG. 16 relates to an embodiment of the present invention, and is a diagram showing an example of a user account database into which a user ID, a password, and the authority of the user have been registered so as to be correlated with each other.

FIG. 22 relates to an embodiment of the present invention, and is a diagram showing an example of a transmission destination correspondence table showing a correspondence relationship between an authentication server and identification information for identifying an authentication information input device.

FIG. 24 related to a third embodiment of the present invention and is a diagram showing another example of a user account database into which a user ID, a password, and the authority of the user have been registered so as to be correlated with each other.

FIG. 25 relates to an embodiment of the present invention, and shows an example of a control instruction table of the control server.

FIG. 29 relates to an embodiment of the present invention, and is a diagram showing an example of operation screen data.

FIG. 30 relates to an embodiment of the present invention, and is a diagram showing UI data obtained by converting the operation screen data of FIG. 29 into a format suitable for the operation panel of the multifunctional apparatus.

DESCRIPTION OF THE EMBODIMENTS

[Embodiment 1]
(Multifunctional Apparatus Control System)

An embodiment of the present invention will be described below with reference to FIGS. 1 through 19. A multifunctional apparatus control system of the present embodiment authenticates a user with use of an authentication information input device and limits/permits the use of a multifunctional apparatus in accordance with a result of the authentication.

Figure 2:
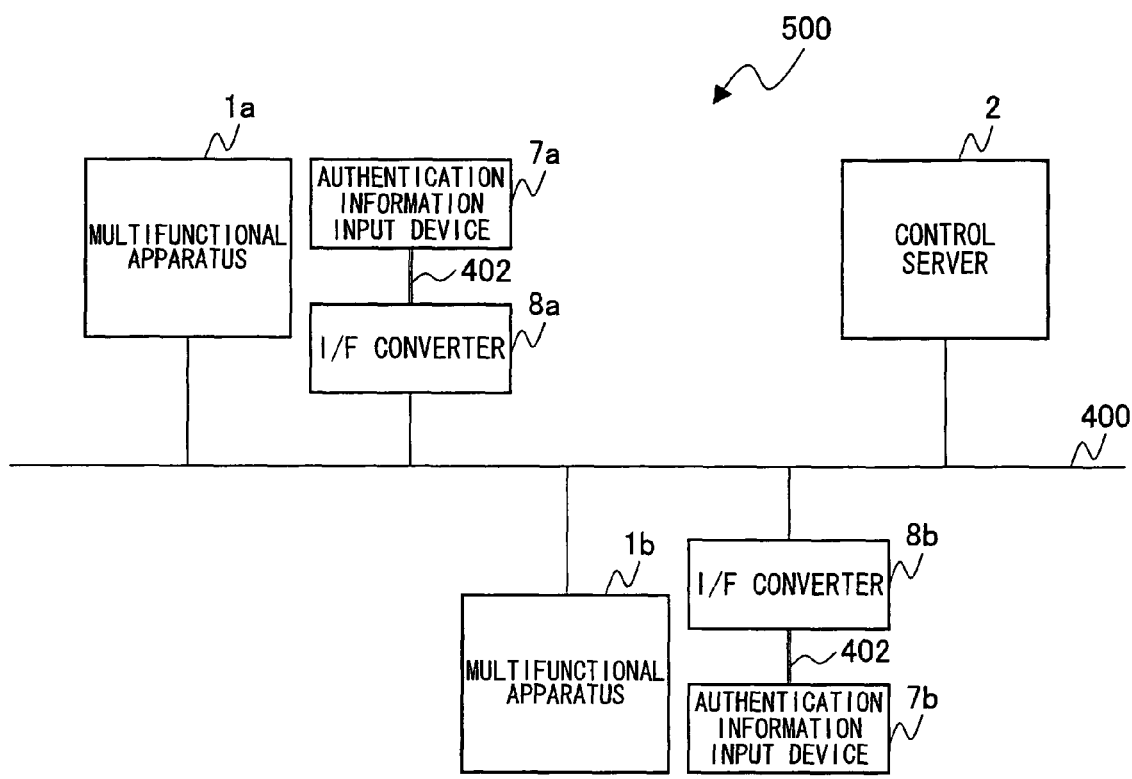
FIG. 2 relates to the first embodiment of the present invention, and is a block diagram schematically showing an arrangement of a multifunction apparatus control system.

FIG. 2 shows an embodiment of the present invention, and is a block diagram schematically showing an arrangement of the multifunctional apparatus control system. As shown in FIG. 2, the multifunctional apparatus control system (imaging apparatus control system) 500 of the present embodiment includes a plurality of multifunctional apparatuses (imaging apparatuses) 1a and 1b, a plurality of authentication information input devices (authentication information acquisition devices) 7a and 7b, and a single control server (control apparatus) 2. The multifunctional apparatus control system 500 is provided with a network 400 that enables the apparatuses and devices to communicate with one another, and each of the apparatuses and devices is connected to the network 400. However, the authentication information input devices 7*a* and 7*b* are not connected directly to the network 400, but are connected to the network 400 via I/F (interface) converters 8*a* and 8*b*, respectively.

As a transmission medium of the network 400, various transmission media can be used. Examples of the transmission media include cable media such as Ethernet®, an optical fiber, and a telephone line or wireless media. Moreover, the present embodiment uses the TCP/IP (Transmission Control Protocol/Internet Protocol) as a communication protocol for the network 400. The TCP/IP is a standard protocol for the Internet or an intranet.

The numbers of multifunctional apparatuses, authentication information input devices, and I/F converters to be contained in the multifunctional apparatus control system 500 may be 1 or not less than 3. Similarly, the number of control servers is not limited to 1. Further, the multifunctional apparatuses 1*a* and 1*b* and the authentication information input devices 7*a* and 7*b* only need to be able to communicate with the control server 2, and do not need to be able to communicate with each other.

Each of the multifunctional apparatuses 1*a* and 1*b* can execute various jobs including image formation and image processing. Examples of jobs including image formation include a print job, and examples of jobs including image processing include a scan job, a color correction job, an image conversion job, a facsimile job, and a PC (personal computer) facsimile job. Furthermore, examples of jobs including a combination of image formation and image processing include a copy job. However, in the multifunctional apparatus control system 500, the multifunctional apparatus may be replaced by an apparatus (i.e., a printer, a facsimile machine, a PC facsimile machine, a scanner, a copier, or the like) for executing at least one of the jobs. The term "PC facsimile job" here refers to a job of transmitting, with use of a facsimile function, image data received from a PC or the like through a network, and the term "PC facsimile machine" here refers to an apparatus for executing such a PC facsimile job.

Figure 3:
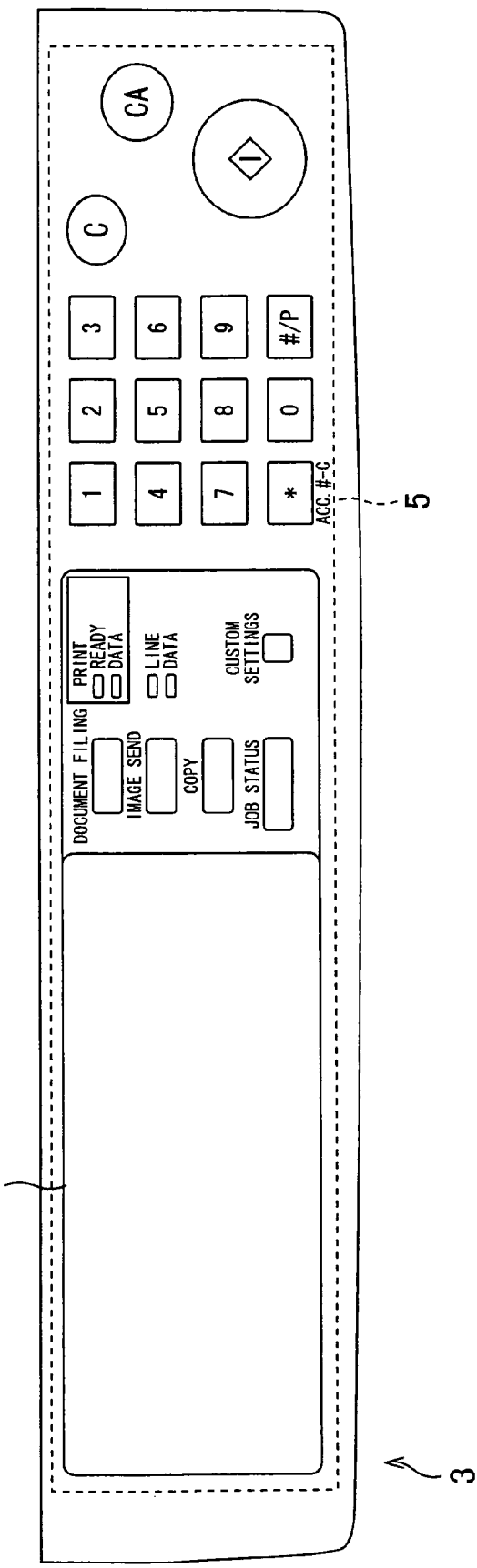
FIG. 3 is an enlarged view of an operation section of a multifunctional apparatus.

Each of the multifunctional apparatuses 1*a* and 1*b* includes an operation section 3 as a user interface. FIG. 3 is an enlarged view of the operation section 3. As shown in FIG. 3, the operation section 3 includes an operation panel (display section) 6 for showing various types of operation screens to a user and an input section (input receiving section) 5 for receiving a user's input. The operation panel 6 employs a touch panel system, and serves also as an input section. Further, each of the multifunctional apparatuses 1*a* and 1*b* is provided with a network communication substrate so as to be able to communicate with the control server 2, another multifunctional apparatus, or another communication terminal apparatus or the like through the network 400.

Each of the authentication information input devices 7*a* and 7*b* is used for acquiring, from a user, authentication information (first authentication information) necessary for authenticating the user, and is installed beside a corresponding one of the multifunctional apparatuses 1*a* and 1*b*. In the present embodiment, the authentication information input device 7*a* is installed beside the multifunctional apparatus 1*a*, and the authentication information input device 7*b* is installed beside the multifunctional apparatus 1*b*. In order to use a multifunctional apparatus, the user must input authentication information to an authentication information input device installed beside the multifunctional apparatus and succeed in authentication.

Examples of the authentication information input devices 7*a* and 7*b* include a magnetic card reader, an IC card reader, a fingerprint reader, a vein reader, an iris reader, a face reader, a voiceprint reader, a handwriting reader, and the like. In cases where each of the authentication information input devices 7*a* and 7*b* is a magnetic card reader or an IC card reader, it acquires a user ID as authentication information from a storage section provided in a card. Alternatively, in cases where each of the authentication information input devices 7*a* and 7*b* is a fingerprint reader, a vein reader, an iris reader, a face reader, a voiceprint reader, or a handwriting reader, it acquires fingerprint information, vein information, iris information, face information, voiceprint information, or handwriting information as authentication information from a user, respectively. Further, each of the authentication information input devices 7*a* and 7*b* may be a keyboard that allows a user to manually input a user ID and a password. The present embodiment assumes, as an example, that the authentication information input device 7*a* is an IC card reader and the authentication information input device 7*b* is a fingerprint reader.

Each of the authentication information input devices 7*a* and 7*b* is designed to be connected to a host apparatus in a non-network way such as USB (Universal Serial Bus), Bluetooth®, or RS-232C. The following assumes that the authentication information input devices 7*a* and 7*b* are connected to the I/F converters 8*a* and 8*b* via USBs (communication paths) 402, respectively.

Each of the I/F converters 8*a* and 8*b* is a so-called USB device server. While the I/F converters 8*a* and 8*b* are connected to the authentication information input devices 7*a* and 7*b* via the USBs 402, respectively, the I/F converters 8*a* and 8*b* are connected to the control server 2 through the network 400. The I/F converters 8*a* and 8*b* serve as relay apparatuses that receive data transmitted from the control server 2 through the network 400 and transmit the data to the authentication information input devices 7*a* and 7*b* via the USBs 402, and that receive data from the authentication information input devices 7*a* and 7*b* via the USBs 402 and transmit the data to the control server 2 through the network 400.

In relaying data, each of the I/F converters 8*a* and 8*b* converts TCP/IP packet data (second packet data) according to a communication protocol (TCP/IP in this case) of the network 400 into USB packet data (first packet data) according to a USB communication protocol, or vice versa. In the latter process, the I/F converter 8*a* or 8*b* adds header information to the USB packet data. For example, the header information contains source and destination IP addresses necessary for communication over the network 400. Then, the I/F converter 8*a* or 8*b* divides the packet into parts each having a predetermined size. In this way, the I/F converter 8*a* or 8*b* creates TCP/IP packet data. In the former process, the I/F converter 8*a* or 8*b* rearranges a TCP/IP packet, removes unnecessary header information such as IP addresses, and creates USB packet data acceptable to the authentication information input device 7*a* or 7*b*.

The control server 2 is constituted by an ordinary personal computer (e.g., IBM PC/AT compatible machine), and a general-purpose Windows® system, Linux, or the like can be used as an operating system for the personal computer. The present embodiment assumes an example where a Windows® system is used. The control server 2 is connected to the network 400, and has the following four main functions of: (1) transmitting, to each of the multifunction apparatuses 1*a* and 1b, data of various types of operation screens displayed for a user; (2) controlling each of the authentication information input devices 7a and 7b so that it acquires authentication information from a user; (3) authenticating the user after receiving the authentication information acquired by the authentication information input device 7a or 7b; and (4) controlling the operation of the multifunctional apparatus 1a or 1b in accordance with a result of the authentication.

In the multifunctional apparatus control system 500 of the present embodiment, neither of the multifunctional apparatuses 1a and 1b basically executes a job on its own. Instead, each of the multifunctional apparatuses 1a and 1b is arranged so as to execute a job under the control of the control server 2. That is, a job execution instruction received from a user via the operation panel 6 of the multifunctional apparatus 1a or 1b is transmitted to the control server 2 first, and then the multifunctional apparatus 1a or 1b executes the job in accordance with a control command transmitted from the control server 2.

It is noted that, in the following, the multifunctional apparatuses 1a and 1b, the authentication information input devices 7a and 7b, and the I/F converters 8a and 8b are termed multifunctional apparatus 1, authentication information input device 7, and I/F converter 8, respectively, if it is unnecessary to distinguish the devices of each pair.

(Control Server)

Figure 4:
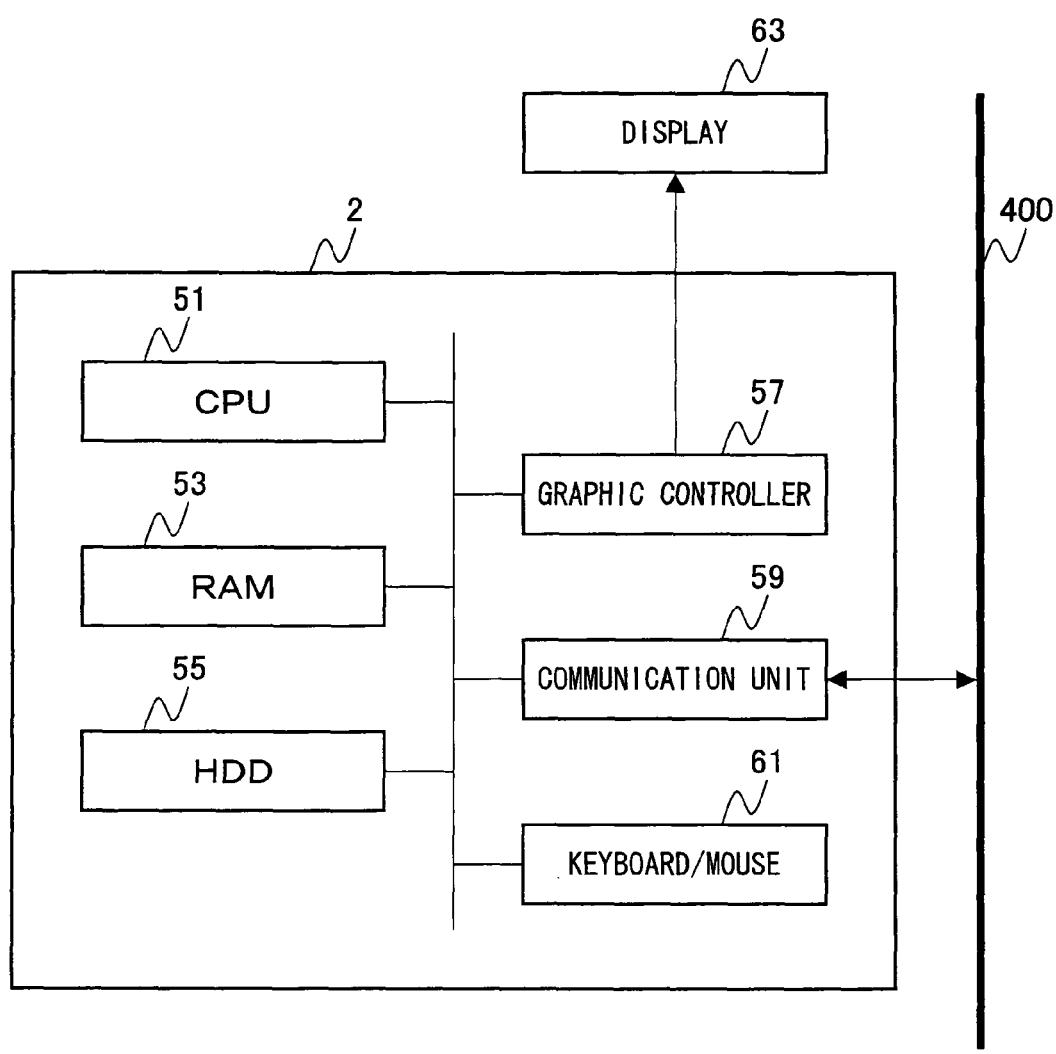
FIG. 4 relates to an embodiment of the present invention, and is a block diagram showing a hardware arrangement of the control server.

FIG. 4 shows an embodiment of the present invention, and is a block diagram showing a hardware arrangement of the control server 2. As shown in FIG. 4, the control server 2 includes a CPU (Central Processing Unit) (computer) 51, a RAM (Random-access Memory) 53, an HDD (Hard-disk Drive) 55, a graphic controller 57, a communication unit 59, a keyboard/mouse 61, and the like. Moreover, the graphic controller 57 is connected to a display 63. Further, the communication unit 59 is connected to the network 400.

The control server 2 loads, onto the RAM 53, various programs stored on the HDD 55. The execution of the programs by the CPU 51 causes the control server 2 to fulfill various functions. Further, the control server 2 notifies a user of various types of information by various screens that the graphic controller 57 causes the display 63 to display, and the communication unit 59 allows the control server 2 to communicate with the apparatuses and devices (e.g., multifunctional apparatus 1 and I/F converter 8) connected to the network 400. Further, the keyboard/mouse 61 enables the user to input various types of information to the control server 2.

Figure 1:
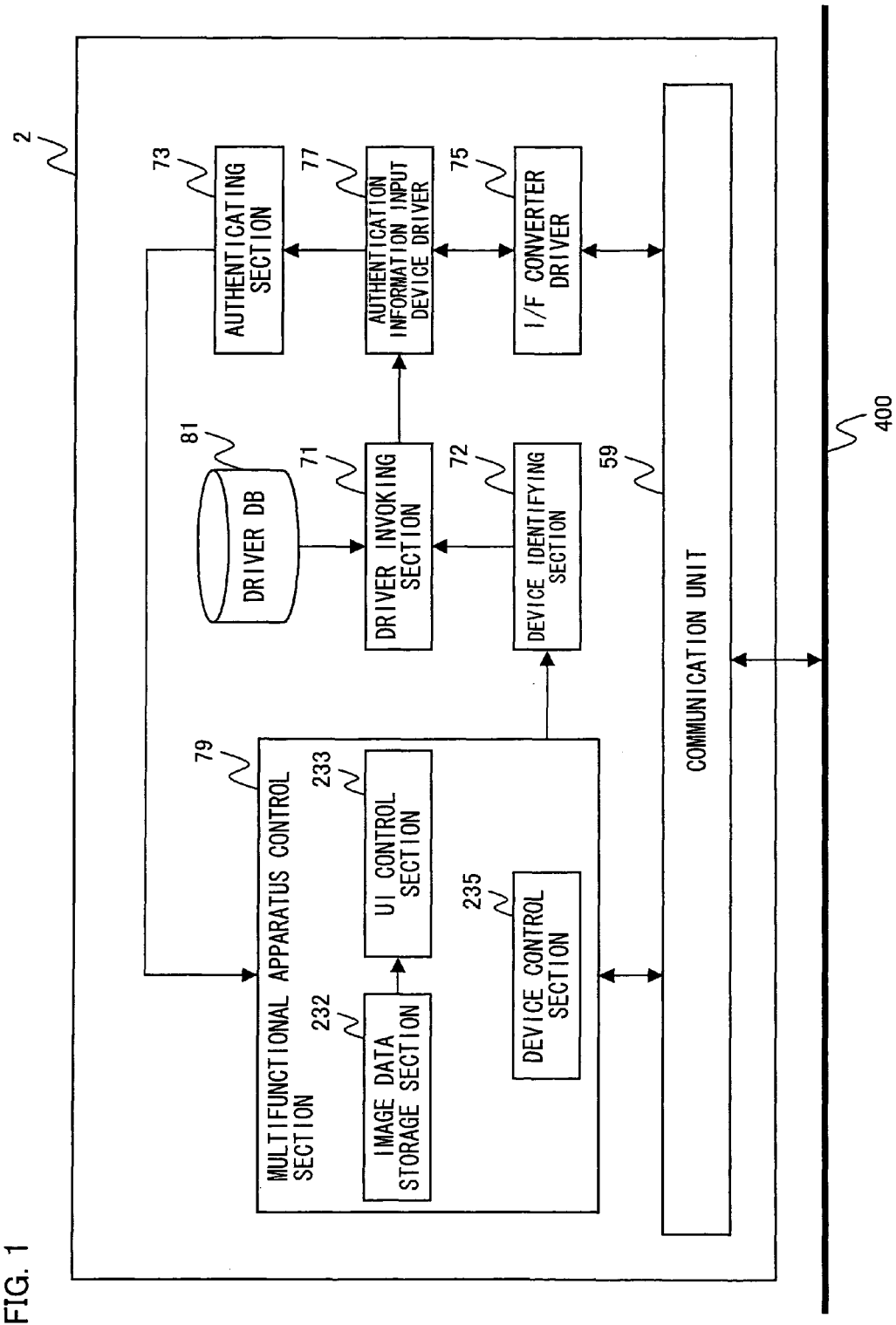
FIG. 1 relates to a first embodiment of the present invention, and is a block diagram showing a functional arrangement of a control server.

FIG. 1 shows an embodiment of the present invention, and is a block diagram showing a functional arrangement of the control server 2. As shown in FIG. 1, the control server 2 includes the following functional blocks: authentication information input device driver (device driver means, authentication information receiving means, command generating means, determining means) 77, an I/F converter driver (device driver means, packet converting means, command transmitting means, determining means) 75, a device identifying section 72, a driver database (driver program storage section) 81, a driver invoking section (driver invoking means) 71, an authenticating section (authenticating means) 73, and a multifunctional apparatus control section 79.

The authentication information input device driver 77 and the I/F converter driver 75 are drivers for controlling the operation of the authentication information input device 7 and the I/F converter 8. More specifically, the authentication information input device driver 77 is a driver for controlling the authentication information input device 7, and the I/F converter driver 75 is a driver for controlling the I/F converter 8.

Specifically, the authentication information input device driver 77 has (i) a function of generating USB packet data containing control commands for instructing the authentication information input device 7 to read authentication information and for controlling the operation of each component of the authentication information input device 7 and (ii) a function of extracting user authentication information by interpreting data transmitted from the authentication information input device 7.

Meanwhile, the I/F converter driver 75 performs the same packet conversion process as the I/F converter 8 does. Specifically, the I/F converter driver 75 converts, into TCP/IP packet data that can be distributed through the network 400, USB packet data generated by the authentication information input device driver 77. In so doing, the I/F converter driver 75 adds, to the USB packet data, header information such as IP addresses necessary for communication over the network 400, and divides the packet into parts each having a predetermined size, thereby creating TCP/IP packet data. The TCP/IP packet data thus created is transmitted to the I/F converter 8 through the network 400 by the communication unit 59.

Further, the I/F converter driver 75 converts, into USB packet data that can be interpreted by the authentication information input device driver 77, TCP/IP packet data received from the authentication information input device 7 through the I/F converter 8, the network 400, and the communication unit 59. In this case, the conversion process is a reversal of the aforementioned process of converting USB packet data into TCP/IP packet data.

In the present embodiment, the I/F converter driver 75 and the aforementioned I/F converter 8 enable the control server 2 and the authentication information input device 7 to communicate with each other regardless of differences in communication interface, thereby enabling the control server 2 to control the authentication information input device 7 over the network 400.

The device identifying section 72 is, when an authorization event occurs in any one of the multifunctional apparatuses 1, installed beside that multifunctional apparatus where the event occurs, and specifies which authentication information input device 7 is used for the authentication. In the present embodiment, the multifunctional apparatus 1a is associated with the authentication information input device 7a. When the authentication information input device 7a succeeds in authentication, the multifunctional apparatus 1a becomes usable. Also, the multifunctional apparatus 1b is associated with the authentication information input device 7b. When the authentication information input device 7b succeeds in authentication, the multifunctional apparatus 1b becomes usable.

The driver database (driver DB) 81 stores a device driver program for controlling the authentication information input device 7. In cases where the authentication information input devices 7a and 7b are different devices, the driver DB 81 stores device driver programs that are respectively used for the devices. That is, the number of device driver programs to be stored in the driver DB 81 corresponds to the number of types of authentication information input devices.

The driver invoking section 71 chooses, from among a plurality of device driver programs stored in the driver DB 81, a device driver program appropriate for an authentication information input device identified by the device identifying section 72, loads the chosen program onto the RAM 53, causes the CPU 51 to execute the program, and causes the CPU 51 to function as the authentication information input device driver 77. This enables the authentication information input device driver 77 to appropriately control an authentication information input device where an input event has occurred.

The authenticating section 73 authenticates a user by making a comparison between authentication information acquired from the user by the authentication information input device 7 and authentication information registered on the user account database.

The multifunctional apparatus control section 79 controls multifunctional apparatuses, and includes an image data storage section 232, a UI control section (authentication screen transmitting means) 233, and a device control section (permitting means, job control means) 235.

The image data storage section 232 stores operation screen data indicating operation screens displayed on the operation panel 6 of each multifunctional apparatus 1. In the present embodiment, the operation screen data is described in a markup language. When the operation screen data supplied to each multifunctional apparatus 1 is described in an abstract markup language, it is possible to display an operation screen suitable for the size or the like of each operation panel 6, even if the multifunctional apparatuses have operation panels 6 of different sizes or the like.

Examples of the markup language include HTML (Hypertext Markup Language), XML (eXtensible Markup Language), WML (Wireless Markup Language), and XHTML (eXtensible HyperText Markup Language). Among them, XML is preferable. XML is a description language whose document structure makes it possible to transmit and receive data as simply as with HTML. XML has the advantages of: (1) allowing a user to define the meaning of a character string contained in a document; (2) not depending on any particular software; and (3) facilitating programming.

The UI control section 233 reads out the operation screen data which is data of various types of operation screens from the image data storage section 232, and sends the data to the multifunctional apparatus 1 via a Web server section 22. Examples of the operation screens include: a function screen for selecting a job to be executed by a multifunctional apparatus 1; a setting screen for determining detailed settings of a job; an authentication screen for prompting a user to place one's IC card, finger, or the like into the authentication information input device 7; and an authentication result screen showing a result of authentication. The UI control section 233 also has a function to receive, from a multifunctional apparatus 1, various types of information that a user inputs to the operation screen. For example, in case where a user inputs a password (second authentication information) to an authentication screen, the UI control section 233 receives the password. The UI control section 233 uses HTTP (hypertext transfer protocol) or HTTPS as a protocol for transmitting operation screen data.

The device control section 235 sends, via the Web server section 22, a control instruction for controlling the operation of a multifunctional apparatus 1 to the multifunctional apparatus 1. The device control section 235 uses SOAP for sending a control instruction to a multifunctional apparatus 1.

(Operation of Control Server)

Figure 6:
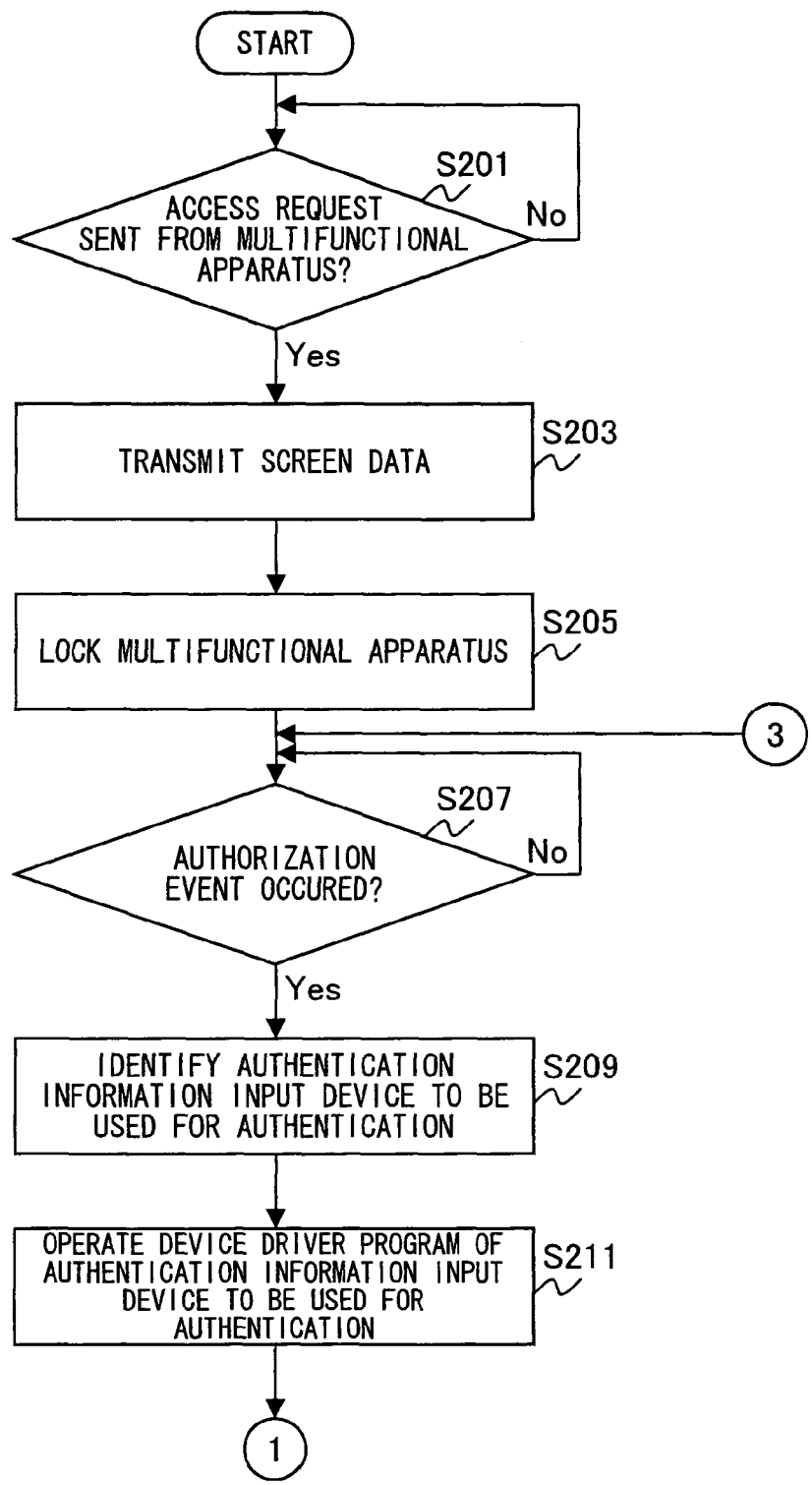
FIG. 6 relates to the first embodiment of the present invention and is a flowchart of the first part of the processing steps in the control server.
Figure 7:
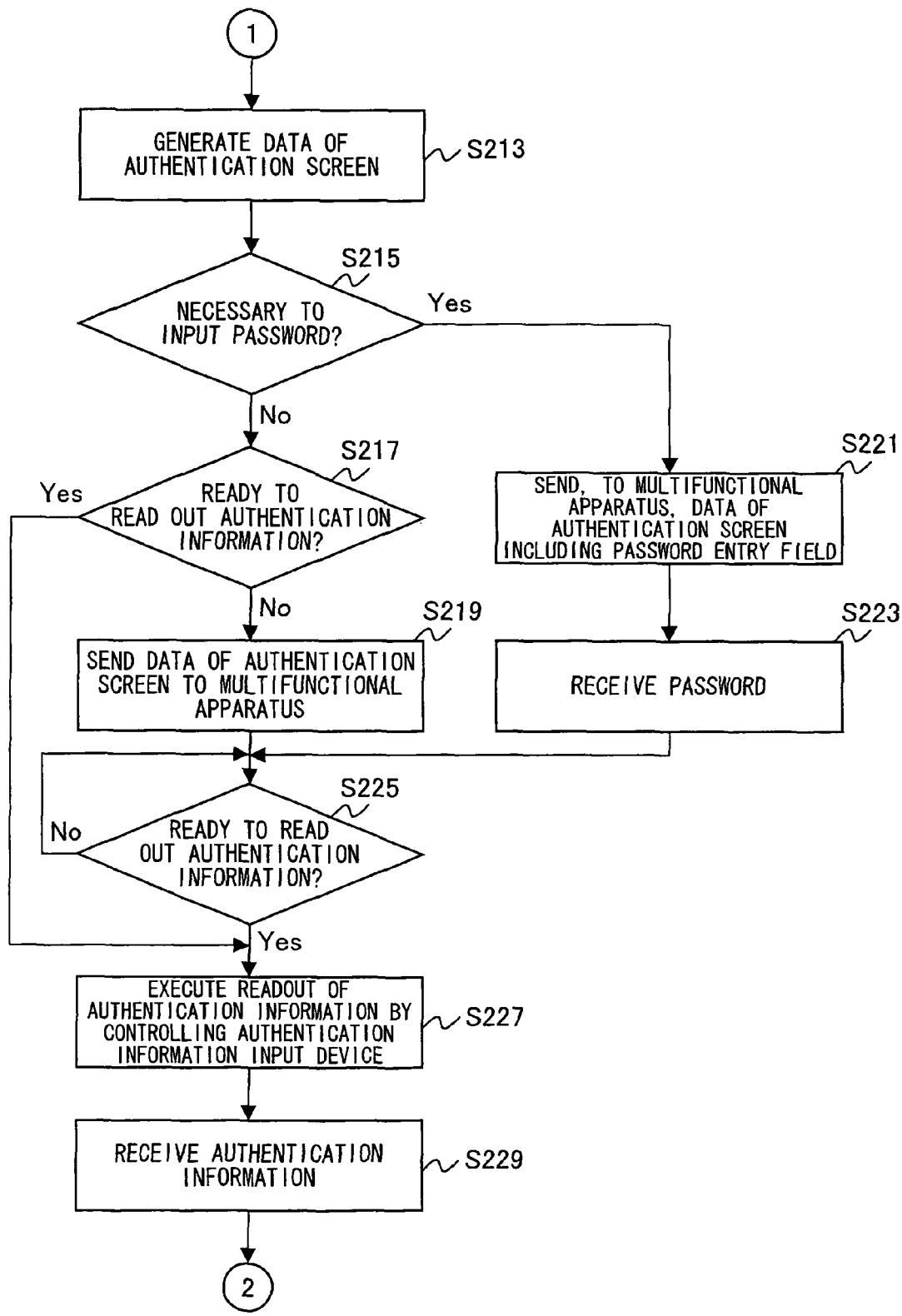
FIG. 7 relates to the first embodiment and is a flowchart of the second part of the processing steps in the control server.
Figure 8:
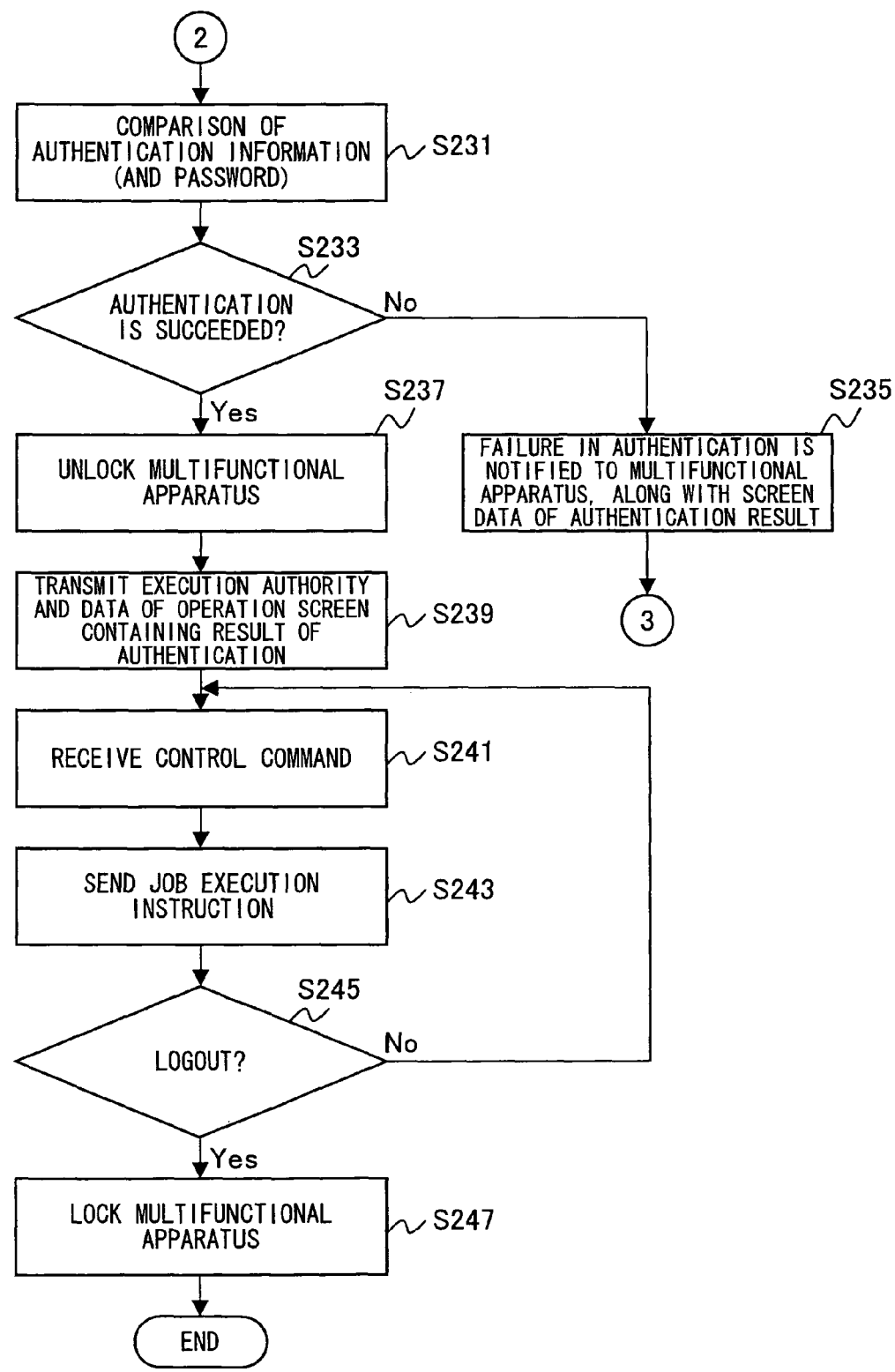
FIG. 8 relates to the first embodiment of the present invention and is a flowchart of the last part of the processing steps in the control server.

The following describes how the control server 2 performs an operation of controlling a multifunctional apparatus and an authentication information input device. FIGS. 6-8 are a flow chart showing processing steps that are taken by the control server 2.

As shown in FIG. 6, first, the multifunctional apparatus control section 79 of the control server 2 judges whether the control server 2 has received an access request from any one of the multifunctional apparatuses (S201). It should be noted that a multifunctional apparatus 1 transmits an access request to the control server 2 at a point of time where the multifunctional apparatus 1 is turned on. In cases where the control server 2 receives no access request from the multifunctional apparatus 1 (No in S201), the process returns to Step S201, where the control server 2 waits until it receives an access request from the multifunctional apparatus 1.

On the other hand, in cases where the control server 2 has received an access request from the multifunctional apparatus 1, the UI control section 233 in the multifunctional apparatus control section 79 transmits, to the multifunctional apparatus 1 from which the control server 2 has received the access request, data of an initial screen to be displayed on the operation panel 6, as a response to the access request (S203). This initial screen includes a message such as, for example, "The multifunction apparatus is locked. Please execute login procedures". The multifunctional apparatus 1, which has received the data, causes the operation panel 6 to display the screen corresponding to the data. After Step S203, the device control section 235 in the multifunctional apparatus control section 79 locks the multifunctional apparatus 1 from which the control server 2 has received the access request (S205). This causes the multifunctional apparatus 1 to wait while refusing to execute a job.

Subsequently, the control server 2 determines whether an authorization event has occurred (S207). In the present embodiment, an authorization event occurs when a user presses one of the buttons in the input section 5 of the multifunctional apparatus 1. Therefore, in the present case, the multifunctional apparatus control section 79 determines whether pressed-button information indicating that a button has been pressed is supplied from the multifunctional apparatus 1.

If it is determined in Step S207 that an authorization event has not occurred, the process returns to Step S207 and the control server 2 waits until an authorization event occurs. On the other hand, if it is determined in Step S207 that an authorization event has occurred, the multifunctional apparatus control section 79 extracts, from the header of the TCP/IP packet data including the pressed-button information, identification information (IP address in this case) of the multifunctional apparatus 1a or 1b that has sent the pressed-button information, and sends the extracted IP address to the device identifying section 72.

The device identifying section 72 that has received the aforesaid IP address is installed beside the multifunctional apparatus 1 where the authorization event has occurred, and specifies which authentication information input device 7 will be used for authentication (S209). In doing so, the device identifying section 72 refers to a first correspondence table in which sets of identification information of authentication information input devices are associated with sets of identification information (IP address in this case) of multifunctional apparatuses. This first correspondence table has been stored in a corresponding imaging apparatus information storage section (not illustrated) in advance. With reference to the first correspondence table, the device identifying section 72 determines the authentication information input device associated with the supplied IP address, as the authentication information input device to be used for authentication.

FIG. 9 shows an example of the first correspondence table. This correspondence table shows that, for example, if an authentication information input device 7a is installed beside a multifunctional apparatus 1a with an IP address "192.168.0.20" and an authorization event occurs in the multifunctional apparatus 1*a*, authentication information is acquired from a user by using the authentication information input device 7*a*.

Next, the driver invoking section 71 invokes, from the driver DB 81, a device driver program for controlling the operation of the authentication information input device 7 identified in Step S209, and causes the program to be executed (S211). In doing so, the driver invoking section 71 refers to a second correspondence table which shows correlation between (i) identification information for identifying an authentication information input device and (ii) identification information for identifying a device driver program. It should be noted that this second correspondence table has been stored in a corresponding driver information storage section (not illustrated) in advance. Then, the device identifying section 72 acquires, from the second correspondence table, device driver program identification information corresponding to identification information for identifying the authentication information input device identified in Step S209. In accordance with the identification information thus acquired, the device identifying section 72 chooses, from the driver DB 81, a device driver program for the authentication information input device to be used for the acquisition of the authentication information, and causes the CPU 51 to execute the device driver program. This enables the authentication information input device driver 77 to control the operation of the authentication information input device 7 to be used for the acquisition of the authentication information.

FIG. 10 illustrates an example of the second correspondence table. As shown in FIG. 10, the second correspondence table shows a correspondence relationship among IP addresses of I/F converters 8, sets of identification information of authentication information input devices 7 connected to the respective I/F converters 8, and sets of identification information of device driver programs by which the operation of each of the respective authentication information input devices 7 is controlled. This correspondence table shows that, for example, the authentication information input device 7*a* is controlled by using the IC card reader driver program. The table also shows that the authentication information input device 7*b* is controlled by using the fingerprint authentication device driver program. The correspondence table further shows that the I/F converter 8*a* is connected to the authentication information input device 7*a*, whereas the I/F converter 8*b* is connected to the authentication information input device 7*b*. The correspondence relationship between the IP addresses of the I/F converters 8 shown in the second correspondence table and the sets of identification information of the authentication information input devices 7 connected to the respective I/F converters 8 is established in such a manner that, the multifunctional apparatus control system 500 is searched for I/F converters 8 by using a known network search protocol, and sets of identification information (IP addresses in this case) of the I/F converters 8 thus found are associated with the sets of identification information of the authentication information input devices 7 connected to the respective I/F converters 8.

Thereafter, the UI control section 233 of the multifunctional apparatus control section 79 reads out material data of the authentication screen from the image data storage section 232 and modifies it according to need, so as to generate the data of the authentication screen (S213). The authentication screen generated in this step corresponds to the authentication information input device 7 identified in Step S209. Details of this step are given below.

Figure 11:
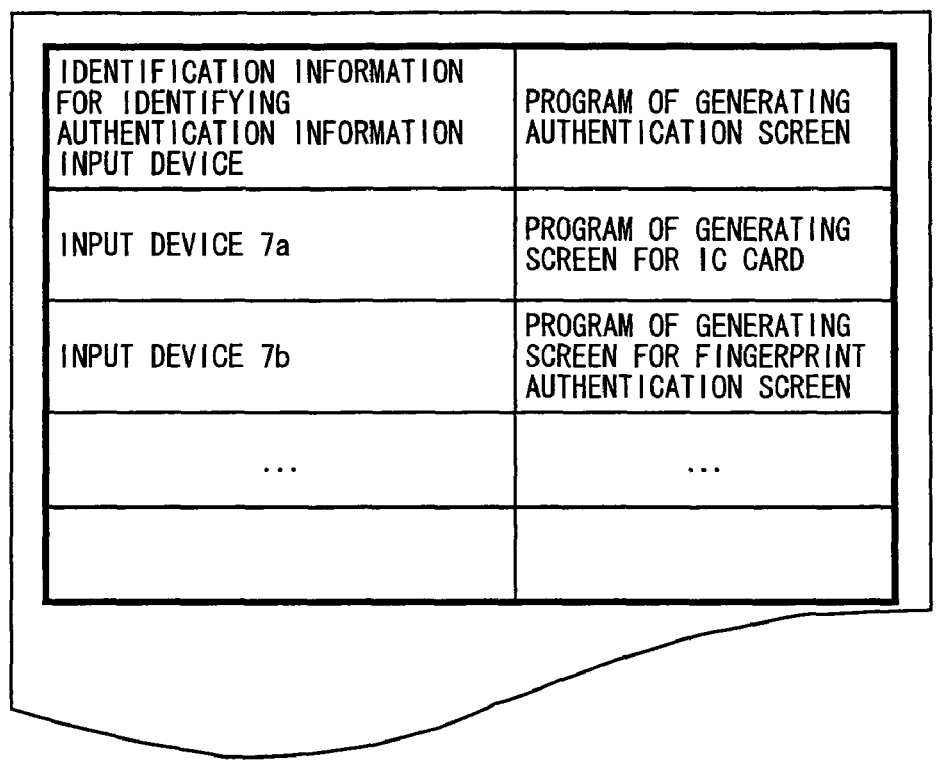
FIG. 11 relates to an embodiment of the present invention and shows an example of a third table showing a correspondence relationship between an authentication information input device and an authentication screen generation program.

In the present embodiment, authentication screen generation programs are prepared for respective types of authentication information input devices, and stored in a storage section (not illustrated). Furthermore, the storage section (not illustrated) stores a third correspondence table showing correspondence information between authentication information input devices and authentication screen generation programs for generating authentication screens suitable for the respective authentication information input devices. FIG. 11 shows an example of the third correspondence table. The example of FIG. 11 shows that the IC card screen generation program is used for acquitting authentication information by means of the authentication information input device 7*a*, whereas the fingerprint authentication screen generation program is used in the case of the authentication information input device 7*b*.

Referring to the correspondence information in the third correspondence table, the UI control section 233 reads out, from the storage section, the authentication screen generation program corresponding to the authentication information input device 7 identified in Step 209, and generates the data of the authentication screen suitable for the identified authentication information input device 7, in accordance with the authentication screen generation program thus read out. Each of the authentication screen generation programs generates data of a suitable authentication screen by properly combining sets of material data of authentication screens, which sets of data are stored in the image data storage section 232.

Figure 12:
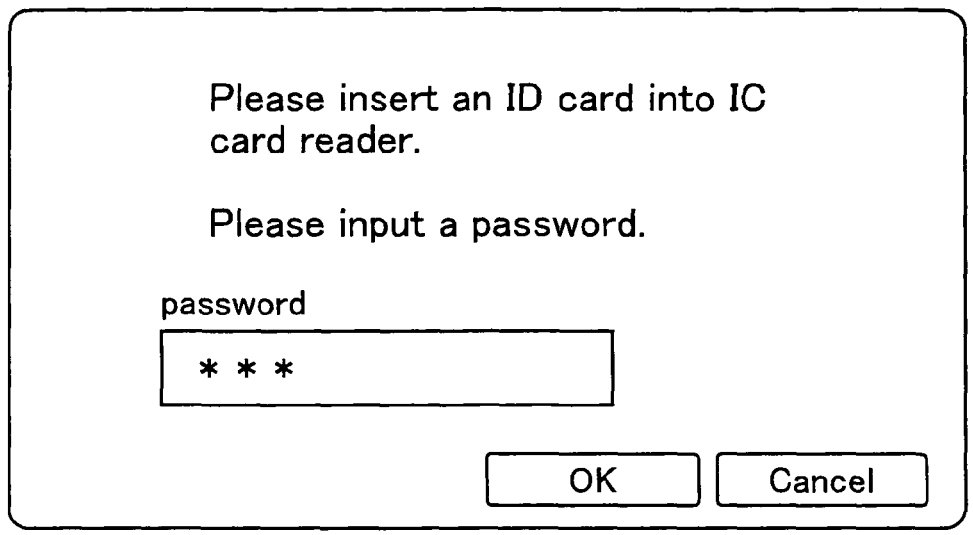
FIG. 12 relates to an embodiment of the present invention, and shows an example of an authentication screen displayed on an operation panel of a multifunctional apparatus, in case where an authentication information input device is an IC card reader.
Figure 13:
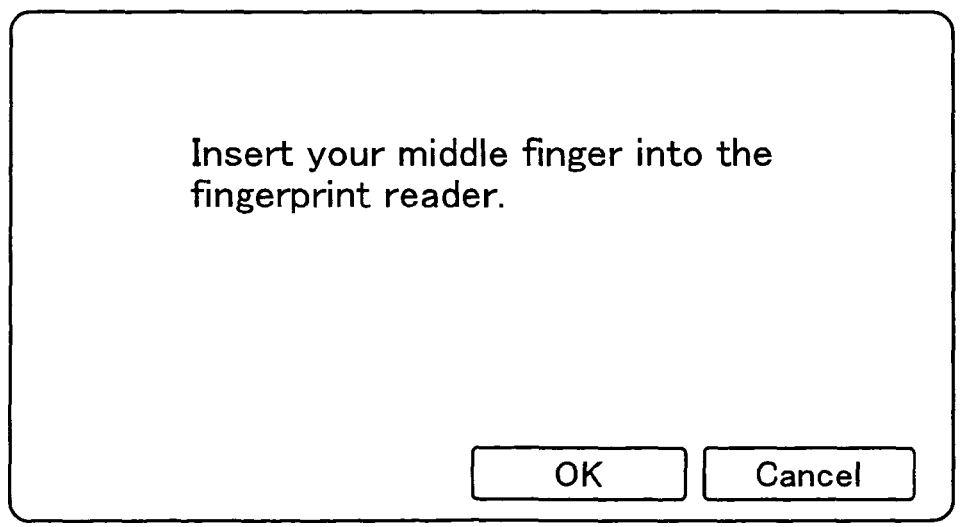
FIG. 13 relates to an embodiment of the present invention, and shows an example of an authentication screen displayed on an operation panel of a multifunctional apparatus, in case where an authentication information input device is a fingerprint reader.

FIG. 12 shows an example of an authentication screen generated by the IC card screen generation program. FIG. 14 shows an example of the data of the authentication screen shown in FIG. 12, which is written in XML. FIG. 13 shows an example of an authentication screen generated by the fingerprint authentication screen generation program, and FIG. 15 shows an example of data of the authentication screen shown in FIG. 13, which is written in XML.

As shown in FIG. 12 and FIG. 13, each of these authentication screens shows a message which prompts a user to place one's ID card or middle finger into the authentication information input device. In other words, the authentication screens show how each of the authentication information input devices 7*a* and 7*b* make preparations for acquiring authentication information, and prompt a user to execute the preparation. As shown in FIG. 12, in case where authentication information is acquired by using an IC card reader, the authentication screen includes not only a message to prompt a user to place one's ID card but also an entry field for the password. In other words, the UI control section 233 causes the data of the authentication screen to include instruction information which gives an instruction to acquire a password, in accordance with the type of the authentication information acquisition device. As shown in FIG. 14, this instruction information is denoted by an input tag embedded in the data of the authentication screen.

Then the UI control section 233 determines whether input of a password along with the authentication information is required (S215). The UI control section 233 carries out the determination by checking whether the generated data of the authentication screen includes an input tag. If it has been determined that input of a password is unnecessary (No in S215), it is determined whether the authentication information input device 7 is ready to read out the authentication information (S217). In this step, the authentication information input device driver 77 and the I/F converter driver 75 cooperate and inquire at the authentication information input device 7 specified in Step S209 about whether an ID card or middle finger is properly placed. Details of this process will be given below.

First, the authentication information input device driver 77 generates a control command which asks the authentication information input device 7 whether an ID card or middle finger is properly placed into the authentication information input device 7, i.e. whether the readout of the authentication information is ready. This control command is arranged as USB packet data. Subsequently, the I/F converter driver 75 converts the USB packet data generated by the authentication information input device driver 77 into TCP/IP packet data which is transmittable over the network 400. In doing so, the I/F converter driver 75 sets, as the destination of the data, the IP address of the I/F converter 8 in the header of the TCP/IP packet.

The IP address of the I/F converter 8 is specified with reference to the aforesaid second correspondence table shown in FIG. 10. In other words, because the second correspondence table includes the correspondence information between the authentication information input devices 7 and the IP addresses of the I/F converters 8, the I/F converter driver 75 specifies, with reference to the second correspondence table, the IP address of the I/F converter 8 corresponding to the authentication information input device 7 specified in Step S209, and sets the specified IP address as the destination. Then the I/F converter driver 75 controls the communication unit 59 so as to send the generated TCP/IP packet data to the target I/F converter 8 over the network 400.

Receiving the TCP/IP packet data, the I/F converter 8 converts the TCP/IP packet data into USB packet data and sends the USB packet data to the authentication information input device 7 connected to that I/F converter 8. In accordance with the control command in the supplied USB packet data, the authentication information input device 7 checks whether the readout of the authentication information is ready (i.e. whether an ID card, middle finger or the like has been properly placed into the apparatus), and returns the checking result to the control server 2 via the I/F converter 8. The checking result is transferred to the authentication information input device driver 77 via the communication unit 59 and the I/F converter driver 75, and the result is analyzed by the authentication information input device driver 77.

If the checking result indicates that the readout is not ready (Yes in S217), the UI control section 233 sends, to the multifunctional apparatus 1, the data of the authentication screen generated in Step S213. As a result, the operation panel 6 of the multifunctional apparatus 1 displays the authentication screen (see FIG. 13) which prompts the user to make preparations for allowing the authentication information input device 7 to acquire the authentication information.

Thereafter, in the same manner as Step S217, while it is determined whether the authentication information input device 7 is ready to read out the authentication information (S225), the entire process is halted until the preparations are completed.

In the meanwhile, if in Step S215 it has been determined that input of a password is necessary (Yes in S215), the UI control section 233 sends, to the multifunctional apparatus 1, the data of the authentication screen generated in Step S213. As a result, the operation panel 6 of the multifunctional apparatus 1 displays the authentication screen (see FIG. 12) which prompts the user to make preparations for allowing the authentication information input device 7 to acquire the authentication information and prompts the user to input a password.

When the user inputs the password using the input section 5 of the multifunctional apparatus 1, the UI control section 233 of the control server 2 receives the password from the multifunctional apparatus 1 and supplies the password to the authenticating section 73 (S223). The process then proceeds to the aforesaid step S225, and is halted until the authentication information input device 7 becomes ready to perform the readout.

When, in Step S225, the user has placed an IC card or middle finger and the readout of the authentication information has become ready, the authentication information input device driver 77 controls the authentication information input device 7 over the network 400, so as to cause the authentication information input device 7 to read out the authentication information (S227).

If, in Step S217, an IC card has already been inserted and the preparations for the readout has been completed, the step of sending the data of the authentication screen by the UI control section 233 is skipped, and Step S227 is carried out. This prevents the multifunctional apparatus 1 from displaying a message prompting a user to input an IC card, even if the IC card has already been inserted.

The readout of the authentication information in Step S227 is carried out in the following manner. First, the authentication information input device driver 77 generates USB packet data containing a control command that instructs the authentication information input device 7 to read authentication information. Then, the USB packet data thus generated is sent to the I/F converter driver 75, and the I/F converter driver 75 converts the USB packet data into TCP/IP packet data in the same manner as the aforesaid inquiry. Then the TCP/IP packet data is transmitted through the communication unit 59 to the I/F converter 8 connected with the authentication information input device 7 specified in Step S209.

The I/F converter 8, which has received the TCP/IP packet data from the control server 2 through the network 400, converts the packet data into USB packet data that is based on the communication protocol of the USB, and then transmits the USB packet data to the authentication information input device 7. In accordance with a control command contained in the USB packet data, the authentication information input device 7, which has received the USB packet data, reads an ID recorded on an IC card, a user's fingerprint, or the like, thereby acquiring authentication information from the user. Then, the authentication information thus acquired is transmitted to the control server 2 via the USB 402, the I/F converter 8*a* or 8*b*, and the network 400. Also in this case, as with the aforesaid inquiry, the I/F converter 8*a* converts the form of USB packet data containing the authentication information, i.e., converts the USB packet data into TCP/IP packet data.

Then, the I/F converter driver 75 of the control sever 2 receives the TCP/IP packet data containing the authentication information transmitted from the authentication information input device 7 (S229), converts the TCP/IP packet data into USB packet data, and sends the USB packet data to the authentication information input device driver 77. Then, the authentication information input device driver 77 extracts the authentication information from the received USB packet data, and then sends the authentication information to the authenticating section 73.

The authenticating section 73 compares the received authentication information with authentication information registered on the user account database provided in advance in a storage section (not shown) (S231). If the password has also been acquired in Step S223, the password is also compared with passwords registered in the user account database, along with the comparison of the authentication information. The user account database shows a correspondence relationship between authentication information (and password) and execution authority for each user. In cases where the authentication information input devices acquire different types of authentication information, the respective types of authentication information (information such as a fingerprint and vein of each user) are registered on the user account database.

FIG. 16 is a diagram showing an example of the user account database. The user account database is used for reading a user ID as authentication information from an IC card and acquiring a password from the operation panel 6 of the multifunctional apparatus 1, and shows a correspondence relationship between the authentication information (i.e., the user ID and the password) and the type (execution authority) of job available to the user. Therefore, the user account database makes it possible to define the execution authority of each user for each job.

For example, the user account database shows that user A whose user ID is "100001" has a password "Afdjaoijs" and is permitted to execute a copy job, a print job, and a facsimile job, and that user C whose user ID is "100003" has a password "Qwiueytq" and is permitted to execute only a copy job.

Figure 17:
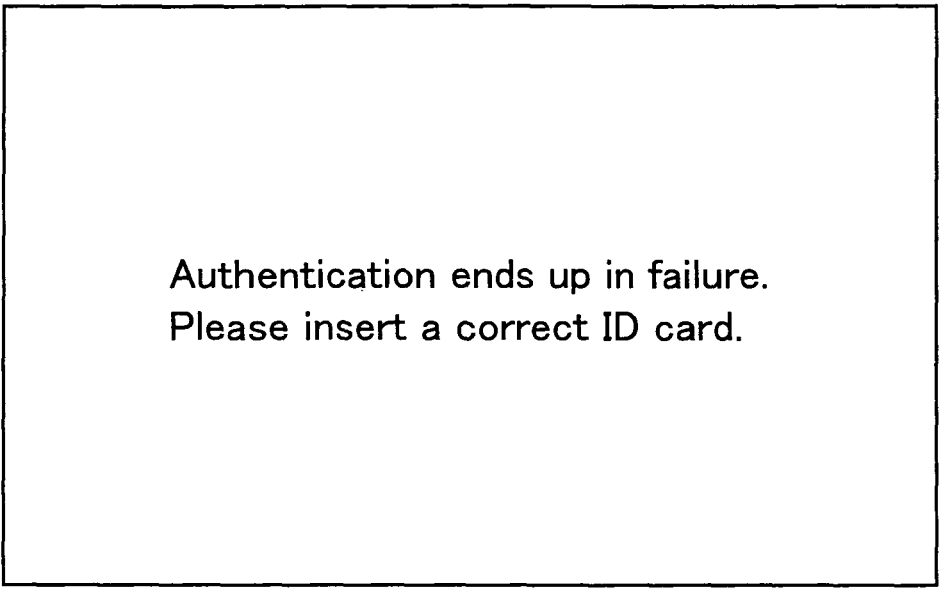
FIG. 17 relates to an embodiment of the present invention, and is a diagram showing an example of a screen, indicating an authentication result, which is displayed on the operation panel of the multifunctional apparatus in cases where authentication ends up in failure.

Then, in cases where the authentication information received from the authentication information input device 7 does not match the authentication information registered on the user account database, or in cases where the authentication information received from the authentication information input device 7 and the password received from the multifunctional apparatus 1 do not match those registered on the user account database (No in S233), the authentication ends up in failure. The device control section 235 notifies the multifunctional apparatus 1 that the authentication has ended up in failure, and the UI control section 233 generates data of a screen indicating the result of authentication (failure in authentication), and transmits the data to the multifunctional apparatus 1 (S235). The destination of the result of authentication and the data in Step S235 is the multifunctional apparatus where the authorization event occurred in Step S207. The multifunctional apparatus 1, which has received the result of authentication and the data of the screen indicating the result of authentication, causes the operation panel 6 to display the screen corresponding to the received data. FIG. 17 shows an example of the screen indicating the result of authentication in cases where the authentication ends up in failure. Then, the process returns to Step S207, where the control server 2 waits until another authorization event occurs in the multifunctional apparatus 1.

On the other hand, in cases where the authentication information received from the authentication information input device 7 matches the authentication information registered on the user account database, or in cases where the authentication information received from the authentication information input device 7 and the password received from the multifunctional apparatus 1 match those registered on the user account database (Yes in S233), the authentication is completed successfully. The device control section 235 unlocks the multifunctional apparatus 1 where the authorization event occurred in Step S207 (S237).

Figure 18:
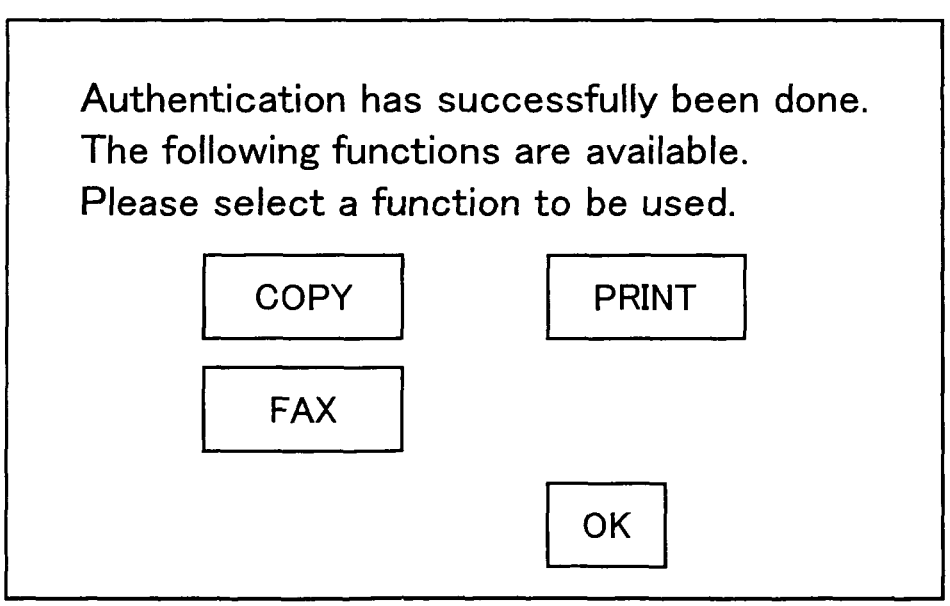
FIG. 18 relates to an embodiment of the present invention, and is a diagram showing an example of n operation screen which is displayed on the operation panel of the multifunctional apparatus in cases where authentication is completed successfully.

Then, the UI control section 233 acquires, from the user account database, the execution authority of a user who has succeeded in authentication, and generates, in accordance with the execution authority thus acquired, data of an operation screen indicating a choice of jobs that the user is allowed to execute. The operation screen contains a result of authentication. The result of authentication indicates that the user has succeeded in authentication. The UI control section 233 transmits data of the operation screen containing the result of authentication to the multifunctional apparatus 1 which has been unlocked, together with the execution authority (S239). The multifunctional apparatus 1, which has received the data of the operation screen, causes the operation panel 6 to display the operation screen corresponding to the received data. This enables the user to know that he/she has succeeded in authentication and to choose a desired job by operating the operation panel 6. However, since the operation screen only displays a choice of jobs that the user is authorized to execute, the user can only choose a job that he/she is authorized to execute. FIG. 18 shows an example of the operation screen that is displayed on the operation panel 6 in cases where the user has succeeded in authentication.

After Step S239, when the user operates the operation panel 6 so as to select a desired job in the multifunctional apparatus 1 which has been unlocked, operation information by which the selected job is specified is supplied from the multifunctional apparatus 1 to the control server 2. Receiving the operation information from the multifunctional apparatus 1 (S241), the UI control section 233 specifies the user-selected job, with reference to the received operation information. Then the device control section 235 sends, to the multifunctional apparatus 1, the job execution information instruction specified by the UI control section 233 (S243). In accordance with this execution instruction, the multifunctional apparatus 1 executes the job.

Thereafter, the UI control section 233 of the control server 2 judges whether or not the user has given a log-off instruction (S245). When the user gives a log-off instruction with use of the operation panel 6 of the multifunctional apparatus 1 that he/she is using, the multifunctional apparatus 1 sends log-off notification to the UI control section 233. Receiving the notification, the UI control section 233 judges that the user has given a log-off instruction. In cases where the user gives no log-off instruction, the process returns to Step S241, where the control server 2 waits for the user to choose another job. On the other hand, in cases where the user has given a log-off instruction, the device control section 235 terminates the process by locking the multifunctional apparatus 1 (S247).

(Operation of Multifunctional Apparatus)

Figure 19:
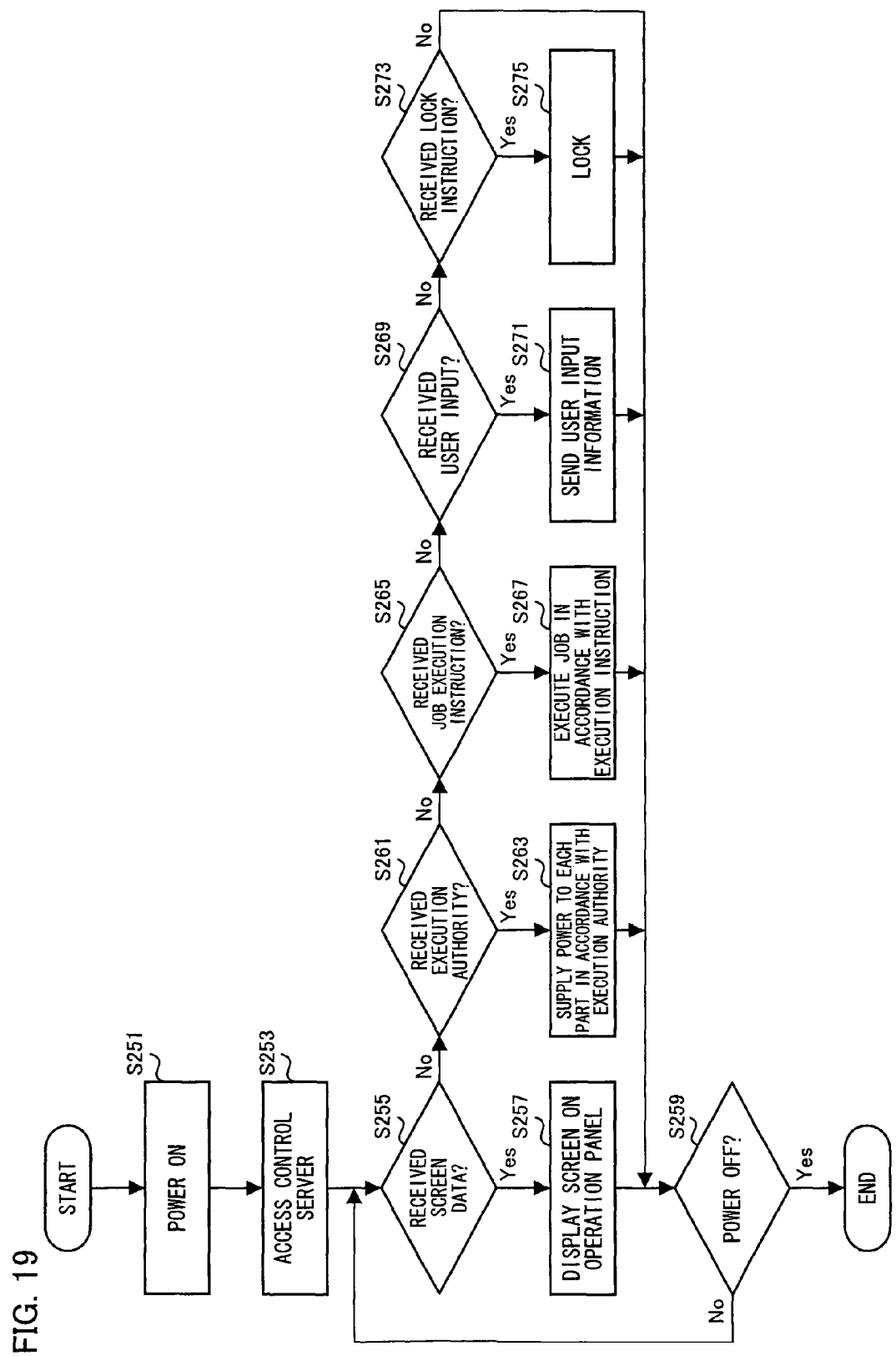
FIG. 19 relates to an embodiment of the present invention, and is a flow chart showing the processing steps performed by the multifunctional apparatus.

The following describes the operation of the multifunctional apparatus 1. FIG. 19 is a flow chart showing processing steps that are taken by the multifunctional apparatus 1. First, when the multifunctional apparatus 1 is turned on (S251), the multifunctional apparatus 1 transmits an access request to the control server 2 (S253). The access request of this step corresponds to the access request of Step S201 described above.

Then, the multifunctional apparatus 1 judges whether or not it has received screen data from the control server 2 (S255). In cases where the multifunctional apparatus 1 has received screen data (Yes in S255), the multifunctional apparatus 1 causes the operation panel 6 to display a screen corresponding to the received data (S257). Then, the multifunctional apparatus 1a or 1b judges whether or not a power-off instruction has been given (Step S259). In cases where a power-off instruction has been given, the process is terminated. In cases where no power-off instruction has been given, the process returns to Step S255.

On the other hand, in cases where the multifunctional apparatus 1a or 1b has not received screen data in Step S255, the multifunctional apparatus 1a or 1b judges whether or not it has received execution authority from the control server 2 (S261). The execution authority of this step corresponds to the execution authority of Step S239 described above. Then, in cases where the multifunctional apparatus 1a or 1b receives execution authority (Yes in S261), the multifunctional apparatus 1a or 1b supplies power to each unit thereof. For example, in cases where a user who has succeeded in authentication is authorized to execute only a print job, the multifunctional apparatus 1a or 1b supplies power solely to an image forming engine necessary for a print job. On the other hand, in cases where the user is authorized to execute all jobs, the multifunctional apparatus 1*a* or 1*b* supplies power to all units such as an image forming engine, a scanner unit, and a facsimile unit. Then, the process proceeds to Step S259.

On the other hand, in cases where the multifunctional apparatus 1 has not received execution authority in Step S261, the multifunctional apparatus 1 judges whether or not it has received a job execution instruction from the control server 2 (S265). The job execution instruction of this step corresponds to the job execution instruction of Step S243 described above. Then, in cases where the multifunctional apparatus 1 has received an instruction to execute a job (Yes in Step S265), the multifunctional apparatus 1*a* or 1*b* executes the job in accordance with the execution instruction (Step S267). Thereafter, the process proceeds to Step S259.

On the other hand, if the execution authority was not received in Step S265, it is determined whether the operation panel 6 has received an input from the user (S269). The input in this step corresponds to an operation such as button press which triggers the aforesaid occurrence of the authorization event in Step S207, the receipt of a password in Step S223, and the selection of a job in Step S241. If an input from the user has been received (Yes in S269), the input information is supplied to the control server 2 (S271). Then the process proceeds to Step S259.

On the other hand, in cases where the multifunctional apparatus 1 has not received an input from the user in Step S269, the multifunctional apparatus 1 judges whether or not it has received a lock instruction from the control server 2 (Step S273). The lock instruction of this step is given from the control server 2 in Steps S205 and S227 described above. Then, in cases where the multifunctional apparatus 1 has received a lock instruction (Yes in S273), the multifunctional apparatus 1 unlocks its functions in accordance with the instruction (Step S275). Then, the process proceeds to Step S259.

(Advantages of Multifunctional Apparatus Control System of Present Embodiment)

As described above, in the multifunctional apparatus control system 500 of the present embodiment, the multifunctional apparatuses 1*a* and 1*b* are arranged so as to be operated mostly under the control of the control server 2. This enables a single control server 2 to integrally manage user accounts and logs of the status of use of the multifunctional apparatuses 1*a* and 1*b*.

Further, the multifunctional apparatus control system 500 of the present embodiment is arranged such that the operation of the authentication information input device 7 is controlled by the control server 2 instead of by the multifunctional apparatus 1. In cases where the multifunctional apparatus 1 controls the operation of the authentication information input device 7 as has been done conventionally, a change in the authentication information input device 7, a change in data format of authentication information recorded on an IC card or the like, or an update of a device driver program requires an arduous task, for example, of replacing ROMs and substrates of the multifunctional apparatus 1 in order to change device driver programs. However, according to the arrangement of the present embodiment, the control server 2 is constituted by an ordinary personal computer or the like. This makes it possible to easily introduce and update a device driver program for a new authentication information input devices. This makes it possible to build a flexible authentication system that makes it possible to easily make a change in authentication method and the like.

Further, the multifunctional apparatus control system 500 of the present embodiment is arranged such that the control server 2 and the authentication information input device 7 communicate with each other via the I/F converter 8. Most of the commercially available authentication information input devices are designed to be connected in a non-network way such as USB. Such a non-network mode of connection as USB imposes limitations on the physical distance between a control source and a control destination according to the specifications. However, the present embodiment uses the I/F converter 8, connects the authentication information input device 7 to the I/F converter 8 by USB, and connects the I/F converter 8 to the control server 2 over the TCP/IP network. This makes it possible to lift limits on the distance between the control server 2 and the authentication information input device 7. This enables the control server 2 to remotely control the authentication information input device 7 installed beside the multifunctional apparatus 1. This makes it possible to freely build an authentication system by using various types of existing authentication information input device.

Furthermore, in the present embodiment, the control server 2 is constituted by a general-purpose personal computer whose operating system is Windows®. This makes it possible to use an existing device driver program and an existing module in developing a device driver program that is stored in the driver DB 81. This makes it possible to save the trouble of developing a new device driver program.

In the present embodiment, the control server 2 has the first correspondence table in which sets of identification information of authentication information input devices 7 are associated with the IP addresses of the multifunctional apparatuses 1 each of which is permitted to execute a job in response to an input of authentication information to the associated authentication information input device 7. Also, the present embodiment is arranged such that, when an authorization event occurs in one of the multifunctional apparatuses 1 on the network 400, it is determined, with reference to the first correspondence table, (i) with which authentication information input device 7 the authentication screen for the multifunctional apparatus 1 is associated and (ii) which authentication information input device 7 is the target of control of the readout operation.

Therefore, even if the multifunctional apparatus control system 500 includes plural multifunctional apparatuses 1 and plural authentication information input devices 7, it is possible to recognize the correspondence relationship between the authentication information input devices 7 and the multifunctional apparatuses 1 each of which is permitted to execute a job in accordance with the authentication result based on the authentication information acquired by the associated authentication information input device 7.

Although the present embodiment is arranged such that the first correspondence table shows one-to-one correspondence between identification information for identifying a single authentication information input device 7 and an IP address of a single multifunctional apparatus 1, the present invention is not limited to this. For example, the IP addresses of a plurality of multifunctional apparatuses may be correlated with identification information for identifying a single authentication information input device. This allows a user to use a plurality of multifunctional apparatuses when he/she succeeds in authentication with use of a single authentication information input device.

In the foregoing embodiment, an authorization event occurs in response to the user's operation of the input section 5 of the multifunctional apparatus 1, and the authentication information input device 7 corresponding to the multifunctional apparatus 1 where the authorization event has occurred is specified with reference to the aforesaid first correspondence table. The present invention, however, is not limited to this arrangement. An authorization event may occur in response to the user's operation of an operation section (not illustrated) of the authentication information input device 7. In this case, the multifunctional apparatus 1 corresponding to the authentication information input device 7 where the authorization event has occurred is specified with reference to the first correspondence table, the data of the authentication screen is supplied to the specified multifunctional apparatus 1, and the multifunctional apparatus 1 is unlocked in accordance with the authentication result.

In the present embodiment, when authentication information is acquired from a user, the data of the authentication screen displayed by the operation panel 6 of the multifunctional apparatus 1 is generated by the UI control section 233 of the control server 2 and supplied to the multifunctional apparatus 1, and the operation panel of the multifunctional apparatus 1 displays the supplied authentication screen. This authentication screen shows (i) how preparations for allowing the authentication information input device 7 to acquire the authentication information are carried out and (ii) a message of prompting a user to carry out the preparations. Therefore, even if the authentication information input device 7 is not provided with a display section, it is possible to prompt a user to execute the authentication operation and instruct the user how to perform the authentication operation. The user can therefore carry out the authentication without confusion. Furthermore, when it is necessary to change the authentication screen because the authentication information input device 7 is replaced with another one, the change can be made only by changing the authentication screen generation program of the control server 2, and hence it is unnecessary to carry out any extensive operations such as the replacement of the ROM or substrate of the multifunctional apparatus 1.

In the present embodiment, the control server 2 includes in advance plural authentication screen generation programs for the respective types of the authentication information input devices 7, and the UI control section 233 generates the authentication screen corresponding to the type of the authentication information acquisition device that acquires authentication information from the user, with reference to the authentication screen generation program corresponding to the type of the authentication information input device 7, and sends the generated authentication screen to the multifunctional apparatus 1. The user can therefore receive suitable instructions suitable for the type of the authentication information acquisition device, thereby being possible to easily carry out the authentication.

In the embodiment above, the data of the authentication screen corresponding to the type of the authentication information acquisition device is generated in such a manner that one of the authentication screen generation programs prepared for respective types of the authentication information acquisition devices suitably combines the materials stored in the image data storage section 232. Alternatively, a similar effect may be achieved in such a manner that the data of authentication screens associated with the respective types of the authentication information acquisition devices are stored in the image data storage section 232 in advance, and the UI control section 233 reads out, from the image data storage section 232, the data of the authentication screen corresponding to the type of the authentication information acquisition device which acquires authentication information from a user, and the UI control section 233 sends the data to the multifunctional apparatus 1.

In the present embodiment, when the type of the authentication information input device 7 is IC card reader or the like, the UI control section 233 sends, to the multifunctional apparatus 1, instruction information which instructs the input section 5 of the multifunctional apparatus 1 to receive input of a password from the user, and the authenticating section 73 performs authentication with reference to the authentication information that the authentication information input device 7 has acquired and the password that the multifunctional apparatus 1 has received. It is therefore possible to perform advanced authentication corresponding to the type of the authentication information input device 7.

In the present embodiment, the data of each authentication screen is described in a markup language, and the aforesaid instruction information is included in the data of the authentication screen, as an input tag. It is therefore possible to easily arrange the display of an authentication screen to be associated with the receipt of the input of a password.

[Embodiment 2]

Another embodiment of the present invention will be described below with reference to FIGS. 20 through 22. Components identical to those described above in Embodiment 1 are given the same reference numerals, and will not be described below.

Figure 20:
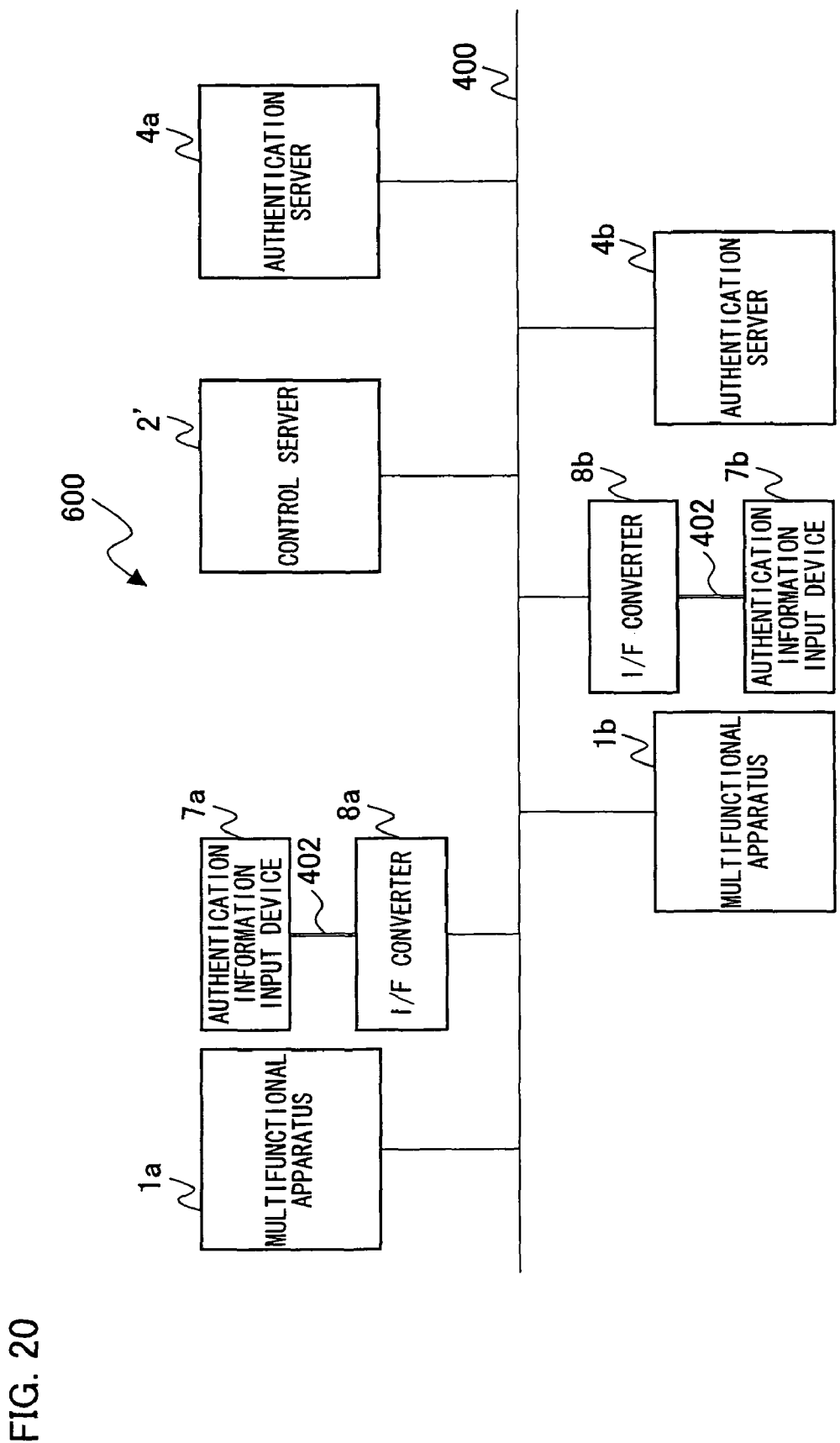
FIG. 20 relates to a second embodiment of the present invention and is a block diagram schematically showing an arrangement of a multifunctional apparatus control system.

FIG. 20 is a block diagram showing an arrangement of a multifunctional apparatus control system 600 of the present embodiment. The multifunctional apparatus control system 600 of the present embodiment includes, as shown in FIG. 20, multifunctional apparatuses 1*a* and 1*b*, a control server 2', authentication servers 4*a* and 4*b*, authentication information input devices 7*a* and 7*b*, and I/F converters 8*a* and 8*b*.

Whereas Embodiment 1 described above is arranged such that the authenticating section 73 of the control server 2 performs a process of authenticating a user, the present embodiment is arranged such that each of the authentication servers 4*a* and 4*b* performs that process. It is noted that, in the explanations below, the authentication servers 4*a* and 4*b* may be collectively termed as authentication server 4. The authentication server 4 includes the same authenticating section 73 and the same user account database as does the control server 2 of Embodiment 1, and authenticates a user by making a comparison between authentication information acquired from the user and authentication information registered on the user account database.

Figure 21:
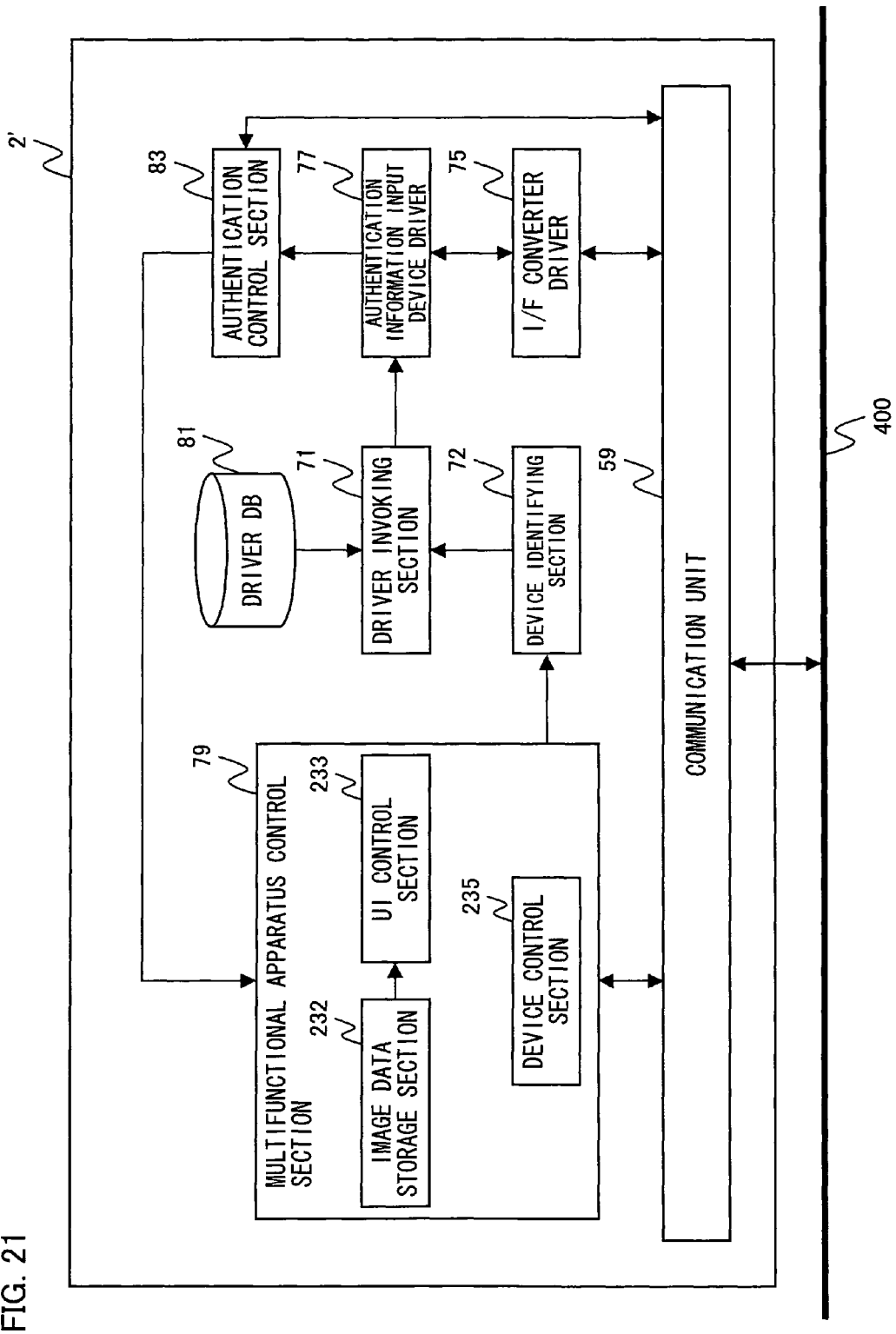
FIG. 21 relates to a second embodiment of the present invention and is a block diagram showing the functions of a control server.

FIG. 21 is a block diagram showing a functional arrangement of the control server 2' of the present embodiment. As shown in FIG. 21, the control server 2' is identical to the control server 2 of Embodiment 1 except that the control server 2' includes an authentication control section (authentication information transmitting means, authentication result receiving means) 83 instead of the authenticating section 73 of Embodiment 1.

The following describes the operation of the control server 2'. In the present embodiment, in Step S229 described above, the authentication information input device driver 77 extracts authentication information from the USB packet data, and then sends the authentication information to the authentication control section 83. Then, the authentication control section 83 transmits the received authentication information to the authentication server 4 through the communication unit 59 over the network 400. In addition, the password that the UI control section 233 has received in Step S223 is supplied to the authentication server 4 by the authentication control section 83.

In so doing, the authentication control section 83 determines the destination of the authentication information and the password in accordance with the type of the authentication information input device 7 from which the authentication information has been acquired. For example, assume that the authentication information input device 7*a* is an IC card reader, that the authentication information input device 7*b* is a fingerprint reader, that the authentication server 4*a* has a user account database on which a user ID and a password are registered as authentication information, and that the authentication server 4*b* has a user account database on which fingerprint information is registered as authentication information. In this case, the authentication information (the user ID) read by the authentication information input device 7*a* and the password received by the multifunctional apparatus 1 are preferably transmitted to the authentication server 4*a*. Similarly, the authentication information (i.e., the fingerprint information) read by the authentication information input device 7*b* is preferably transmitted to the authentication server 4*b* that has the user account database on which fingerprint information is registered as authentication information.

In view of this, the authentication control section 83 refers to a transmission destination correspondence table, stored in a corresponding server information storage section (not shown), which correlates (i) identification information for identifying an authentication information input device 7 with (ii) identification information (i.e., an IP address in this case) for identifying an authentication server 4, and acquires an IP address of an authentication server 4 corresponding to identification information for identifying the authentication information input device 7 identified in Step S209. Then, the authentication control section 83 transmits, to the authentication server 4 whose IP address has been acquired, the authentication information received from the authentication information input device driver 77 and the password received from the UI control section 233.

FIG. 22 is a diagram showing an example of the transmission destination correspondence table. The transmission destination correspondence table shows that while the authentication information read by the authentication information input device 7*a* is transmitted to the authentication server 4*a* whose IP address is "192.168.0.30", the authentication information read by the authentication information input device 7*b* is transmitted to the authentication server 4*b* whose IP address is "192.168.0.31".

Then, in the same manner as described above in Step S231 of Embodiment 1, the authentication server 4, which has received the authentication information from the authentication control section 83 of the control server 2' through the network 400, compares the received authentication information with the authentication information registered on the user account database. Furthermore, if the password has also been received, the authentication server 4 compares the received password with the passwords registered on the user account database. Then, in cases where the received authentication information matches the authentication information registered on the user account database (i.e., in cases where authentication has been completed successfully), the authentication server 4 transmits, to the authentication control section 83 of the control server 2', notification that authentication has been completed successfully and user's execution authority indicated by the user account database. On the other hand, in cases where the received authentication information does not match the authentication information registered on the user account database (i.e., in cases where authentication has ended up in failure), the authentication server 4 notifies the authentication control section 83 of the control server 2' that authentication has ended up in failure.

The authentication control section 83, which has been notified by the authentication server 4 of the success or failure in authentication, proceeds with the process to Step S235 or S237 in accordance with whether the received notification indicates success or failure in authentication. The subsequent steps are identical to those of Embodiment 1.

As described above, the present embodiment is arranged such that each of the authentication servers 4 performs a process of authenticating a user. This makes it possible to prevent the control server 2' from being overloaded by a process of authenticating a user.

Further, the present embodiment is arranged such that: the multifunctional apparatus control system 600 includes the plurality of authentication servers 4; and an authentication server that performs authentication is chosen depending on the type of authentication information input devices 7. This makes it possible to disperse load caused by an authentication process.

[Embodiment 3]

Still another embodiment of the present invention will be described below with reference to FIGS. 23 and 24. Components identical to those described above in Embodiment 1 are given the same reference numerals, and will not be described below.

Figure 23:
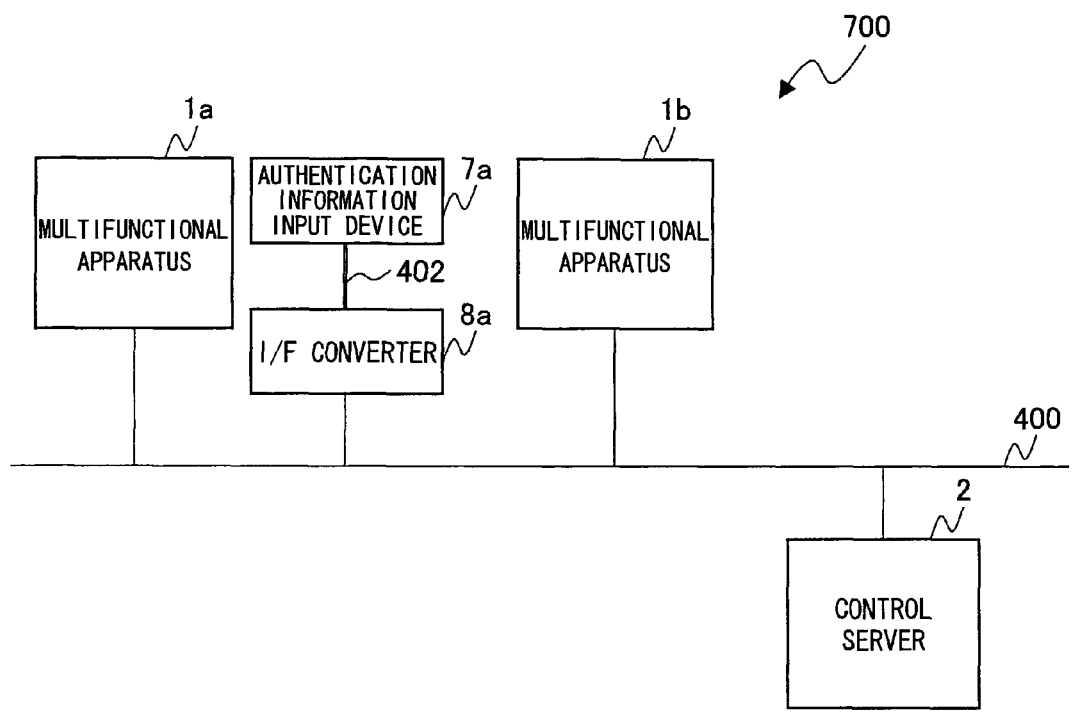
FIG. 23 relates to a third embodiment of the present invention and is a block diagram schematically showing an arrangement of a multifunctional apparatus control system.

FIG. 23 is a block diagram showing an arrangement of a multifunctional apparatus control system 700 of the present embodiment. The multifunctional apparatus control system 700 of the present embodiment includes a single authentication information input device 7*a*, a single I/F converter 8*a*, a plurality of (two in this case) of multifunctional apparatuses 1*a* and 1*b*, and a control server 2. Authentication information inputted to the authentication information input device 7*a* is used for permitting the use of both the multifunctional apparatuses 1*a* and 1*b*.

Whereas Embodiment 1 described above is arranged so as to decide, in accordance with an authentication information input device 7 used for inputting authentication information, what multifunctional apparatus 1 becomes available, the present embodiment is arranged so as to decide, in accordance with the execution authority of a user, what multifunctional apparatus 1 becomes available. For this reason, identification information (i.e., an IP address in this case) for identifying a multifunctional apparatus available to a user and the type of job are registered on the user account database as authority that is correlated with authentication information for authenticating the user.

FIG. 24 is an example of the user account database of the present embodiment. For example, the user account database shows that user A whose user ID is "100001" is permitted to use the multifunctional apparatus 1*a* whose IP address is "192.168.0.20" and the multifunctional apparatus 1*b* whose IP address is "192.168.0.21", and that the user is permitted to execute a copy job, a print job, and a facsimile job in each of the multifunctional apparatuses 1*a* and 1*b*. Meanwhile, the user account database shows that user C whose user ID is "100003" is permitted to use only the multifunctional apparatus 1*a* whose IP address is "192.168.0.20", and that the user is permitted to execute only a copy job in the multifunctional apparatus 1*b*.

Further, each of the multifunctional apparatuses 1*a* and 1*b* is provided with a high-intensity LED (not shown) so positioned on the exterior of a housing as to be easily seen from a user.

The following describes the operation of the control server 2. In the present embodiment, in cases where the authentication of aforesaid Step S231 has been completed successfully (Yes in S233), the device control section 235 acquires, from the user account database, the authority (IP address of the multifunctional apparatus 1 and the type of job) of the user who has succeeded in authentication, and recognizes that a multifunctional apparatus 1, whose IP address corresponds to the acquired IP address, is available to the user. Next, the device control section 235 transmits, to the multifunctional apparatus 1 whose IP address corresponds to the acquired IP address, a control command to instruct the multifunctional apparatus 1a or 1b to unlock itself and a control command to instruct the high-intensity LED to blink.

As a result, the multifunctional apparatus 1, which has received the control commands, unlocks itself and causes the high-intensity LED to blink, in accordance with the control commands. The blinking of the high-intensity LED notifies the user that he/she is allowed to use the multifunctional apparatus 1 provided with the high-intensity LED. Then, the process proceeds to Step S239. The subsequent steps are identical to those of Embodiment 1.

As described above, the present embodiment chooses an available multifunctional apparatus in accordance with authentication information provided from a user. In other words, in cases where a multifunctional apparatus control system includes a plurality of multifunctional apparatuses, the present embodiment makes it possible to determine, for each multifunctional apparatus, whether the use of the multifunctional apparatus is permitted or prohibited. This makes it possible to limit the types of available multifunctional apparatus in accordance with users.

Further, the present embodiment is arranged such that a single input of authentication information to the single authentication information input device 7a makes it possible to use the plurality (two in this case) of multifunctional apparatuses 1a and 1b. Such an arrangement is preferable because it saves the user the trouble of an authentication process necessary for, for example, performing a tandem process with use of both the multifunctional apparatuses 1a and 1b.

Further, the present embodiment is arranged so as to blink a high-intensity LED of a multifunctional apparatus whose use has been permitted. Thus, the multifunctional apparatus whose use has been permitted is caused by the control server 2 to notify the user that the multifunctional apparatus is available. This enables the user to quickly figure out which multifunctional apparatus is available.

Examples of notifying means for notifying the user that the multifunctional apparatus is available are not limited to the high-intensity LED, but may be various devices that give visual notification and various devices that give audio notification.

Furthermore, in the present embodiment, the control server 2 has a user account database in which authentication information of a user is associated with the type of a job that the user can use (i.e. authority), and the multifunctional apparatus control section 79 allows or prohibits a user to execute each job of a multifunctional apparatus. This makes it possible to variously limit each user's use of a multifunctional apparatus.

[Supplements to Embodiments 1 to 3]
(Details of Control of Multifunctional Apparatus by Control Server)

In the following, the control of a multifunctional apparatus by the multifunctional apparatus control section 79 will be described more in detail. It should be noted that the following arrangement is common to Embodiments 1 to 3.

As described above, the control server 2 or 2' controls the jobs of the multifunctional apparatus 1 via the communication network 400. In order to control various features of the multifunctional apparatus 1, the device control section 235 may utilize one or more web services provided by the multifunctional apparatus 1. Examples of the control of various features of the multifunctional apparatus 1 include switching between validation and invalidation of a function of the apparatus, setting a function of the apparatus, and controlling a function of the apparatus. A web service refers to program processing that allows an external apparatus to use a function of an application over a network. A typical web service uses SOAP.

Further, the multifunctional apparatus 1 acquires data of various types of operation screens from the control server 2 or 2', and causes the operation panel 6 to display the operation screen corresponding to the acquired data. This enables the multifunctional apparatus 1 to display an operation screen simply by requesting the control server 2 or 2' for operation screen data. This makes it unnecessary for the multifunctional apparatus 1 to manage operation screen data.

Further, regardless of the type of multifunctional apparatus 1, the multifunctional apparatus 1 discloses common APIs (Application Program Interface) (control instructions). This enables the control servers 2 and 2' to output common control instructions to the multifunctional apparatus 1 regardless of the type of multifunctional apparatus 1. This makes it possible to easily develop a program that is embedded in the control server 2 or 2' even if various types of multifunctional apparatuses 1 with different functions concurrently exist. The API is a contract that defines commands for use in software development and procedures for using the commands.

It should be noted that the multifunctional apparatus 1 and the control servers 2 and 2' use HTTP or HTTPS, which uses SSL (Secure Socket Layer), to communicate with each other in requesting operation screen data or in responding to the request. The use of HTTPS makes it possible to improve security.

Meanwhile, in communicating a control instruction for the control server 2 or 2' to control the multifunctional apparatus 1, an inter-object communication protocol using a markup language such as XML is used. Examples of such a protocol include SOAP (Simple Object Access Protocol). SOAP is a protocol, based on XML, HTTP, and the like, which is used for invoking data and services. SOAP can enable systems to cooperate with one another.

The following describes an arrangement for the control of operation of the multifunctional apparatus 1 by the control server 2 or 2'.

Figure 5:
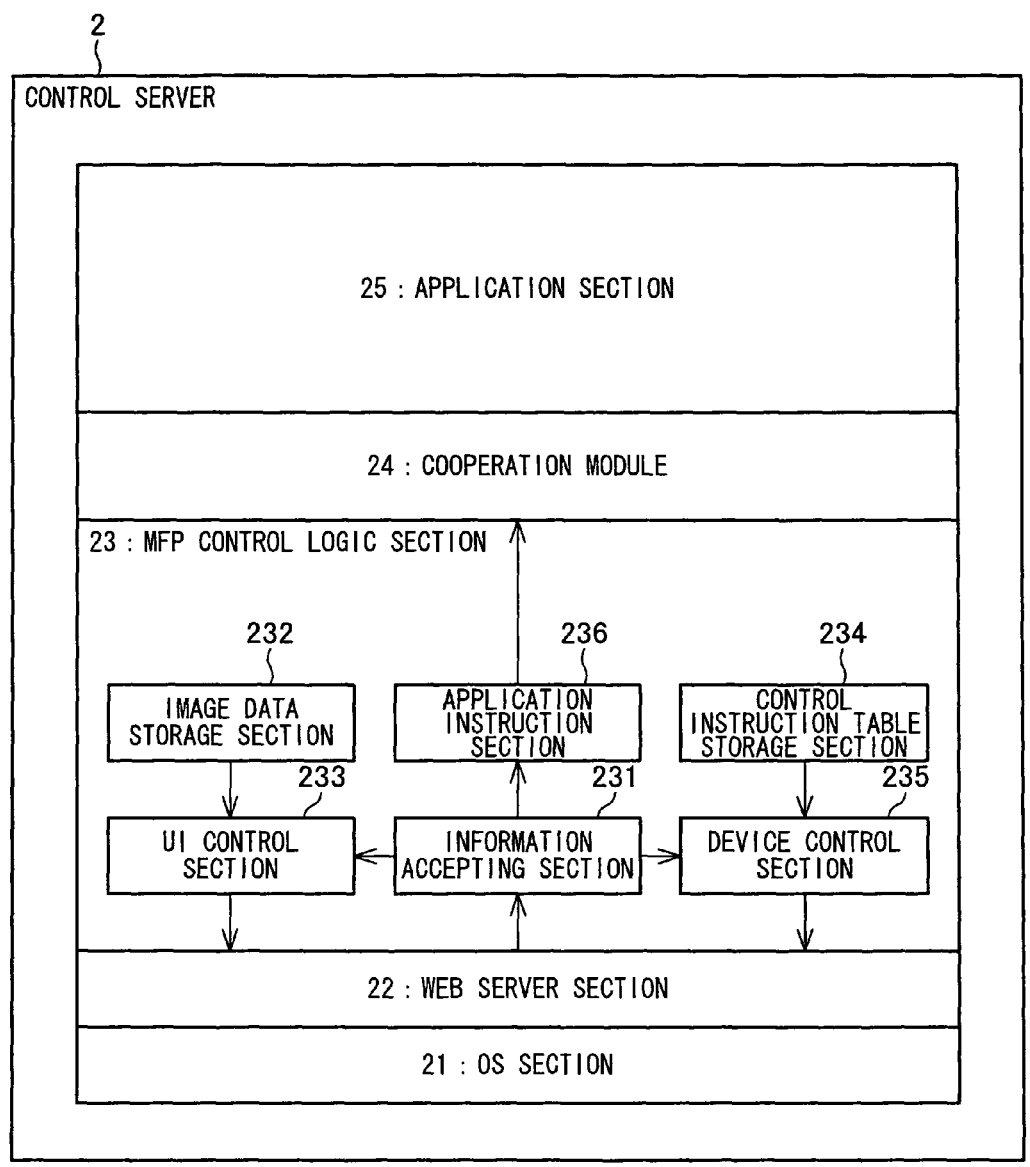
FIG. 5 relates to an embodiment of the present invention and is a functional block diagram illustrating an arrangement regarding the control of the operation of the multifunction apparatus, in the internal arrangement of the control server.

FIG. 5 is a block diagram showing an internal structure of each of the control servers 2 and 2' according to the present embodiment, especially an arrangement regarding the control of the multifunctional apparatus 1. As shown in FIG. 5, each of the control servers 2 and 2' includes an OS section 21, a Web server section 22, an MFP control logic section 23, and a cooperation module 24, as the multifunctional apparatus control section 79 described above. Furthermore, each of the control servers 2 and 2' includes an application section 25. The aforesaid authenticating section 73 and authentication control section 83 are included in the application section 25.

The OS section 21 is a block that manages a computer system and thereby executes a process in accordance with an operating system (OS) which provides a basic user operating environment. Examples of the OS include Windows® as described above.

The Web server section 22 performs communication with use of HTTP (Hypertext Transfer Protocol) (or HTTPS) and SOAP (Simple Object Access Protocol). The Web server section 22 receives an HTTP request from the multifunctional apparatus 1, and transmits an HTTP response corresponding to the HTTP request. Examples of the Web server section 22 include a block that performs an operation in accordance with software such as Apache.

The MFP control logic section 23 controls an operation screen (UI) of the multifunctional apparatus 1 and various functions of the apparatus. The MFP control logic section 23 includes the aforesaid screen data storage section 232, a UI control section 233, a device control section 235, an information accepting section 231, a control instruction table storage section 234, and an application instruction section 236.

The information accepting section 231 accepts information from the multifunctional apparatus 1 via the Web server section 22, and instructs the UI control section 233, the device control section 235 (execution instruction transmitting means), or the application instruction section 236 to execute a process corresponding to the information.

It should be noted that examples of the information accepted by the information accepting section 231 from the multifunctional apparatus 1a or 1b include transmission request information for requesting data designated by a URL (Uniform Resource Locator), pressed-button information indicating a button pressed on an operation screen that is displayed on the operation panel 6 of the multifunctional apparatus 1 by the UI control section 233, and processing request information for the application section 25.

The information accepting section 231 acquires the processing request information from the Web server section 22 with use of SOAP. Further, the information accepting section 231 acquires the transmission request information and the pressed-button information from the Web server section 22 with use of HTTP (or HTTPS).

In cases where the information accepting section 231 accepts transmission request information, the transmission accepting section 231 outputs the transmission request information to the UI control section 233.

Further, the information accepting section 231 manages a pressed button-processing content table that correlates, with pressed button information indicating a button pressed on the operation screen, processing information indicating the content of a process that is performed by any one of the UI control section 233, the application instruction section 236, and the device control section 235 in accordance with the pressing of the button.

In cases where the information accepting section 231 accepts pressed-button information, the information accepting section 231 specifies, from the pressed button-processing content table, processing content information corresponding to the pressed-button information. Then, the information accepting section 231 instructs the UI control section 233, the application instruction section 236, and the device control section 235 to execute a process indicated by the specified processing content information. That is, in cases where the processing content information is information concerning UI control, the information accepting section 231 notifies the UI control section 233 of the content indicated by the information. In cases where the processing content information is information concerning an application, the information accepting section 231 notifies the application instruction section 236 of the content indicated by the information. In cases where the processing content information is information concerning device control, the information accepting section 231 notifies the device control section 235 of the content indicated by the information.

Furthermore, in addition to the pressed button-processing content table, the information accepting section 231 manages a processing request-processing content table that correlates, with processing request information for the application section 25, processing content information indicating the content of a process that is performed by any one of the UI control section 233, the application instruction section 236, and the device control section 235 in accordance with the processing request information.

In cases where the information accepting section 231 accepts processing request information, the information accepting section 231 specifies, from the processing request-processing content table, processing content information corresponding to the processing request information. Then, the information accepting section 231 instructs the UI control section 233, the application instruction section 236, and the device control section 235 to execute a process indicated by the specified processing content information.

In accordance with the content of an instruction given from the information accepting section 231, the application instruction section 236 causes the application section 25 to start a predetermined process.

The control instruction table storage section 234 stores a control instruction table that correlates, with a control content for the multifunctional apparatus 1a or 1b, a control instruction that is given in cases where control is performed in accordance with the control content. FIG. 25 is a diagram showing an example of the control instruction table. For example, as shown in FIG. 25, the control instruction table storage section 234 stores the control content "scan" in association with the control instructions "JobCreate", "ExecuteScan", and "JobClose". In case where the control instruction table storage section 234 stores a plurality of control instructions in association with a single piece of control content, the control instruction table storage section 234 also stores the order of output (order of control) of the control instructions is also stored.

It should be noted, as will be mentioned later, that a control instruction stored in the control instruction table storage section 234 is a command for calling an API disclosed by a Web service layer 17 of each of the multifunctional apparatuses 1, and an API disclosed by the multifunctional apparatus 1 is a common API that does not depend on the type of multifunctional apparatuses 1.

The application section 25 is a block that performs processes corresponding to various applications. For example, the application section 25 performs operations such as the aforesaid authentication process performed by the authenticating section 73.

The cooperation module 24 is a module via which the application section 25 and the MFP control logic section 23 are connected to each other. The cooperation module 24 transmits a command from the application instruction section 236 to the application section 25, and transmits a command from the application section 25 to the device control section 235.

Figure 26:
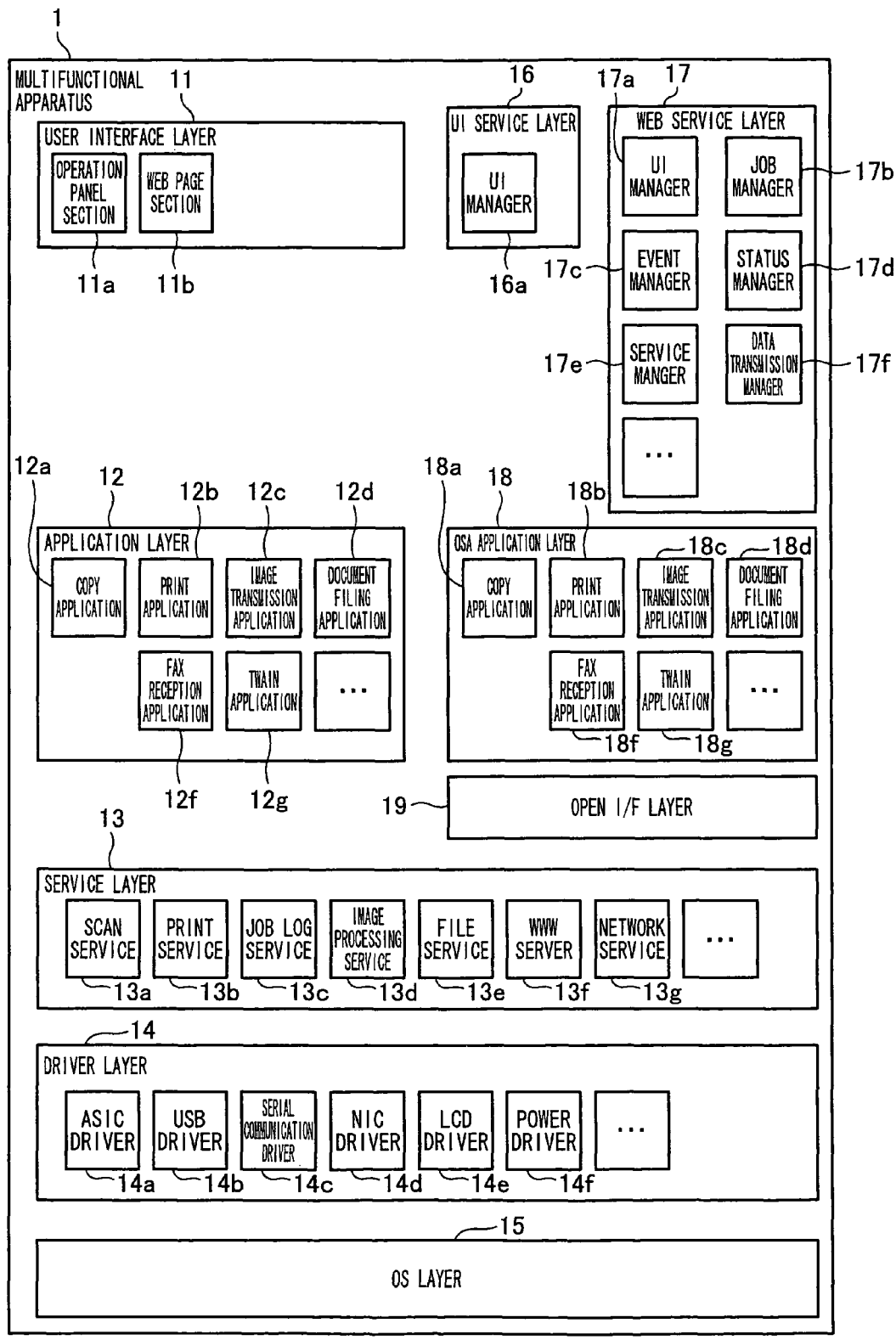
FIG. 26 relates to an embodiment of the present invention, and is a block diagram showing the functions of the multifunctional apparatus.

The following describes an internal structure of each of the multifunctional apparatuses 1 with reference to a block diagram of FIG. 26. As shown in FIG. 26, the multifunctional apparatus 1 includes a user interface layer 11, an application layer 12, a service layer 13, a driver layer 14, an OS layer 15, a UI service layer 16, a Web service layer 17, an OSA application layer 18, and an Open I/F layer 19.

The user interface layer 11 is an interface for a user to operate the multifunctional apparatus 1a or 1b. The user interface layer 11 stores an operation screen unique to each of the multifunctional apparatuses 1a and 1b, and causes the operation panel 6 to display the unique operation screen. The user can control the multifunctional apparatus 1a or 1b by providing the unique operation screen with an input for executing a desired function. It should be noted that the user interface layer 11 has an operation panel section 11a that performs a process of transmitting, to the application layer 12, information inputted to the unique operation screen of the multifunctional apparatus 1.

Further, the Web page section 11*b* performs a process of transmitting, to the application layer 12, information inputted to a Web page.

The application layer 12 operates in accordance with an application that controls various apparatus functions of the multifunctional apparatus 1, and the application layer 12 realizes cooperation jobs. The term "cooperation jobs" here refers to jobs that are realized by appropriately combining elemental jobs such as a scan job, a print job, an image processing job, and a communication job. Examples of the cooperation jobs that are realized by appropriately combining the elemental jobs include: a copy job, which is executed by combining the scanning job, the image processing job, and the print job; and an image transmitting job, which is executed by combining the scan job and the communication job.

The application layer 12 of the present embodiment includes a copy application 12*a* for executing/controlling the copy job, a print application 12*b* for executing/controlling the print job, an image transmitting application 12*c* for executing/controlling the job (image transmitting job) of transmitting scanned image data to an external apparatus, a document filing application 12*d* for executing/controlling a document filing job, a fax receiving application 12*f* for executing/controlling a fax receiving job, a TWAIN application 12*g* for executing/controlling a TWAIN job, and the like.

The service layer 13 is a layer located so as to be subordinate to the application layer 12, and controls various elemental jobs of the multifunctional apparatus 1*a* or 1*b* in accordance with instructions given from the application layer 12.

The service layer 13 of the present embodiment includes elemental jobs such as a scan service 13*a* for controlling a scan operation, a print service 13*b*, controlling a print operation, which is used at the time of executing/controlling a print job and a copy job, a job log service 13*c* for controlling information management for each job, an image processing service 13*d* for controlling image formation such as image creation, a file service 13*e* for performing an image managing control operation such as document filing, a WWW server service 13*f* for performing control for remote access via a Web page, and a network service 13*g* for controlling an operation of communicating with use of a LAN, a telephone line, or the like.

The driver layer 14 is located so as to be subordinate to the service layer 13, and performs an operation in accordance with software for controlling hardware of the multifunctional apparatus 1. The driver layer 14 of the present embodiment includes an ASIC driver 14*a* that relates to image formation, a USB driver 14*b* for performing USB communication, a serial communication driver 14*c* for performing serial communication, a NIC driver 14*d* for performing LAN communication, an LCD driver 14*e* for performing display control of the operation panel 6, and a power driver 14*f* for managing power.

The OS layer 15 is a layer located so as to be subordinate to the driver layer 14, and manages an operating system.

It should be noted that the user interface layer 11, the application layer 12, the service layer 13, the driver layer 14, and the OS layer 15 perform an operation in accordance with software unique to the multifunctional apparatus 1*a* or 1*b* and differ from one type of multifunctional apparatus to another. The provision of these layers enables the multifunctional apparatus 1 to directly accept an instruction from a user without a communication network and to perform an operation in accordance with the instruction.

However, in cases where there is only a layer unique to such a multifunctional apparatus 1 as described above, a new application or the like needs to be incorporated into the multifunctional apparatus 1 for the purpose of performing control accompanied by a process using the new application. This takes a lot of trouble. In view of this, as will be described below, the multifunctional apparatus 1 of the present embodiment includes a layer which, by cooperating with an authentication application of an external control server 2 or 2', enables the multifunctional apparatus 1 to be controlled by the control server 2 or 2'.

The UI service layer 16 acquires operation screen data from the control server 2 or 2' with use of HTTP (or HTTPS), and causes the operation panel 6 to display an operation screen that is based on the acquired operation screen data. It should be noted that the UI service layer 16 may have a function of a general-purpose Web browser.

The provision of the UI service layer 16 and the user interface layer 11 enables the user to use an operation screen of the operation panel 6 for (i) a standard operation mode in which, by operating an operation screen (displayed by the user interface layer 11) unique to the multifunctional apparatus 1*a* or 1*b*, a job corresponding to the operation is executed by the multifunctional apparatus 1*a* or 1*b* or (ii) an open system mode of using a network resource (e.g., RCD application).

The UI service layer 16 includes a UI manager 16*a* that performs display control of a UI (operation screen) provided from the control server 2 or 2'.

As discussed above, the data of the operation screen displayed by the multifunctional apparatus 1 is provided as a Web page (or its equivalence) by the control server 2 which is an Web server. The UI service layer 16 stores the URL of initial operation screen data acquired from the control server 2 or 2'.

With reference to the stored URL, the UI manager 16*a* of the UI service layer 16 sends, by HTTP (or HTTPS), transmission request information for requesting initial operation screen data designated by the URL, to the control server 2 or 2'. Then the UI manager 16*a* causes the operation panel 6 to display an initial operation screen based on the acquired operation screen data. Thereafter, the UI manager 16*a* sends, by HTTP (or HTTPS), pressed-button information indicating which button on the operation screen has been pressed, to the control server 2 or 2'. Then the UI manager 16*a* acquires new operation screen data supplied in response to the information, and causes the operation panel 6 to display a screen based on the acquired data.

The Web service layer 17 receives a control instruction from the control server 2 or 2' with use of SOAP, and invokes, from the OSA application layer 18, an appropriate module corresponding to the control instruction. Further, the Web service layer 17 creates a SOAP command indicating information supplied from the OSA application layer 18, and transmits the SOAP command to the control server 2 or 2'. In the Web service layer 17, a control instruction and a module of the OSA application layer 18 which module is appropriate for control indicated by the control instruction are stored so as to be correlated with each other, and the Web service layer 17 invokes an appropriate module in accordance with the memory content.

The Web service layer 17 of the present embodiment includes a UI manager 17*a* for processing a Web service concerning UI control, a job manager 17*b* for processing a Web service concerning job control, an event manager 17*c* for processing a Web service concerning an event transmission request, a status manager 17*d* for processing a Web service concerning status control of a job or of a device, a service manager 17*e* for registering information concerning the OSA application layer 18, a data transmission manager 17*f* for processing a Web service for transmitting and receiving a job, and the like.

The OSA application layer 18 is an application for controlling the aforesaid cooperation jobs. The OSA application layer 18 creates a first API calling command for controlling an elemental job that is a part of a cooperation job, and then sends the first API calling command to the Open I/F layer 19.

The OSA application layer 18 of the present embodiment includes a copy application 18*a* for executing/controlling the copy job, a print application 18*b* for executing/controlling the print job, an image transmitting application 18*c* for executing/controlling the job (image transmitting job) of transmitting scanned image data to an external apparatus, a document filing application 18*d* for executing/controlling the document filing job, a fax receiving application 18*f* for executing/controlling the fax receiving job, a TWAIN application 18*g* for executing/controlling the TWAIN job, and the like.

The Open I/F layer 19 provides APIs which are used for controlling, by a common method independent from the types, service layers 13 which are different among the types of the multifunctional apparatuses 1. More specifically, the Open I/F layer 19 converts a first control command supplied from the OSA application layer 18 into a second control command acceptable by the service layer 13. It is also noted that first control commands are acceptable by any types of multifunctional apparatus 1. This makes it possible for the Web service layer 17 to define, regardless of the types of multifunctional apparatuses 1, a common method that is disclosed to an external apparatus. That is, each of the control servers 2 and 2' can make a request to the Web service layer 17 with use of a common control instruction regardless of the types of multifunctional apparatuses 1.

The Open I/F layer 19 is, for performing the aforesaid command conversion, provided with an API table storage section for storing an API table (not illustrated) in which first control commands that are acceptable by the Open I/F layer 19 are associated with second control commands acceptable by the service layer 13. With reference to the API table, the Open I/F layer 19 sends a second control command to the service layer 13.

Figure 27:
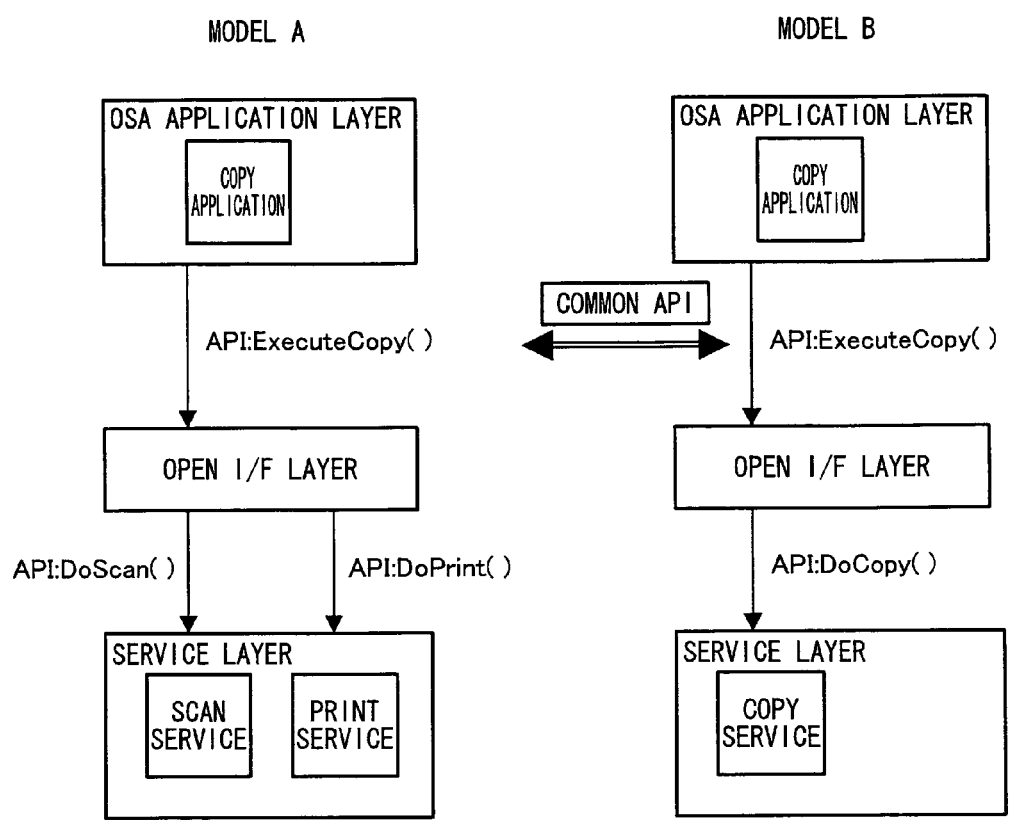
FIG. 27 is a diagram illustrating the functions of an Open I/F layer.

FIG. 27 is a diagram illustrating the function of an Open I/F layer 19. In FIG. 27, Model A of multifunctional apparatus 1*a* has a service layer 13 that includes a scan service 13*a* and a print service 13*b*. In this case, Model A of multifunctional apparatus 1*a* has an Open I/F layer 19 that stores an API table in which a first control command "ExecuteCopy" is correlated with second control commands "DoScan" and "DoPrint". Therefore, when the first control command "Execute Copy" is supplied from the control server 2 or 2' via the OSA application layer 18 and the Open I/F layer 19, the service layer 13 of the multifunctional apparatus 1*a* executes the scan service 13*a* and the print service 13*b*.

Meanwhile, Model B of multifunctional apparatus 1*b* has a service layer 13 that includes a single copy service as an elemental function. In this case, Model B of multifunctional apparatus 1*b* has an Open I/F layer 19 that stores an API table in which the first control command "ExecuteCopy" is correlated with a second control command "DoCopy". Therefore, when the first control command "ExecuteCopy" is supplied, the multifunctional apparatus 1 can execute the copy service. In this way, the Open I/F layer 19 has a function to cancel out the differences among the types of the multifunctional apparatuses 1, by converting a control command with reference to the API table.

(Process of Displaying Operation Screen)

The following describes a preferable display process of an operation screen in the UI service layer 16 of the multifunctional apparatus 1.

Operation screen data that is transmitted from the UI control section 233 of the control server 2 or 2' to the UI service layer 16 of the multifunctional apparatus 1 contains (i) screen style information (screen type information) indicating a screen style (screen format) of an operation screen), (ii) part type information indicating the types (e.g., title, square button, radio button, and check box) of parts (screen parts) that constitute the operation screen, and (iii) sub-information indicating texts on the parts.

Meanwhile, the UI manager 16*a* of the UI service layer 16 includes a screen table storage section (not shown) in which (a) the screen style information and (b) part display information indicating the display style (e.g. shape and size) and location of each of the parts (e.g., title, square button, radio button, and check box) that constitute the screen defined by the screen style are stored so as to be correlated with each other. Then, the UI manager 16*a* converts the received operation screen data into UI data suitable for the operation panel 6 of the multifunctional apparatus 1.

Specifically, first the UI manager 16*a* extracts the screen style information, the part type information, and the sub-information from the operation screen data supplied from the control server 2 or 2'.

Then, the UI manager 16*a* reads out, from the screen table storage section (not shown), the part display information corresponding to the screen style information extracted from the operation screen data, and determines the location of each of the parts in accordance with the order of description of the parts in the operation screen data.

Further, the UI manager 16*a* reads out, from the screen table storage section (not shown), the part display information corresponding to the screen style information extracted from the operation screen data, and the UI manager 16*a* determines the display format of each of the parts in accordance with the part type information extracted from the operation screen data. Furthermore, the UI manager 16*a* determines, in accordance with the sub-information extracted from the operation screen data, texts to be respectively displayed in the parts. Then, the UI manager 16*a* creates UI data in accordance with the content of the determinations.

Figure 28:
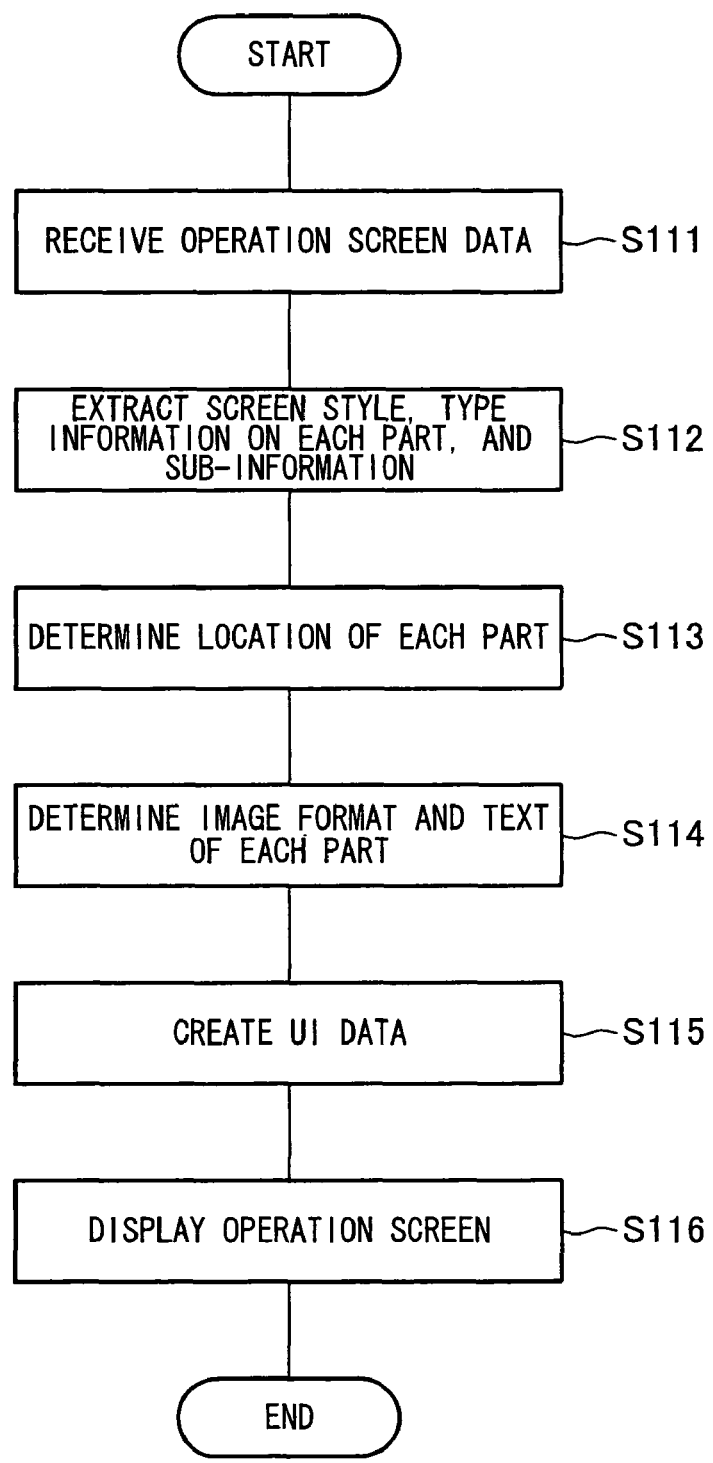
FIG. 28 relates to an embodiment of the present invention, and is a flow chart showing a flow of a process of displaying an operation screen by a multifunctional apparatus.

A flow of the process of displaying an operation screen will be fully described below with reference to the flow chart of FIG. 28. First, the UI manager 16*a* receives operation screen data from a PC (S111). FIG. 29 is a diagram showing an example of the operation screen data transmitted from the control server 2 or 2'. In FIG. 29, Section (A) designates the design structure and title of the operation screen. It should be noted that "osa_menu" indicates screen style information, which is defined in each multifunctional apparatus 1. In this case, "osa_menu" corresponds to such a screen style that a control button is located in an upper portion of the screen and a content button is located in a lower portion of the screen.

Section (B) designates the control button that is displayed in the upper portion of the operation screen. Section (C) designates the title displayed on the control screen. Section (D) designates the content button. The "type="submit"" indicates a submit button. The "title" indicates a character string displayed on the button. The "type="checkbox"" indicates a check box. The "selected="true"" indicates a style instruction for causing the corresponding check box to be selected by default.

Next, the UI manager 16*a* extracts the screen style information "osa_menu", part type information, and sub-information from the operation screen data. (S112).

Thereafter, the UI manager 16a reads out, from the screen table storage section (not shown), each piece of part display information corresponding to the screen style information "osa_menu", and then determines the location of each of the parts in accordance with the order of description of the parts in the operation screen data. (S113).

Furthermore, the UI manager 16a determines a display format in accordance with the part display information and the part type information ("submit" and "checkbox") extracted from the operation screen data, and also determines, in accordance with the sub-information, texts to be respectively displayed in the parts (S114).

Then, the UI manager 16a creates UI data in accordance with the content of the determinations (S115). For example, the UI manager 16a creates, from the operation screen data of FIG. 29, such UI data as shown in FIG. 30.

Figure 31:
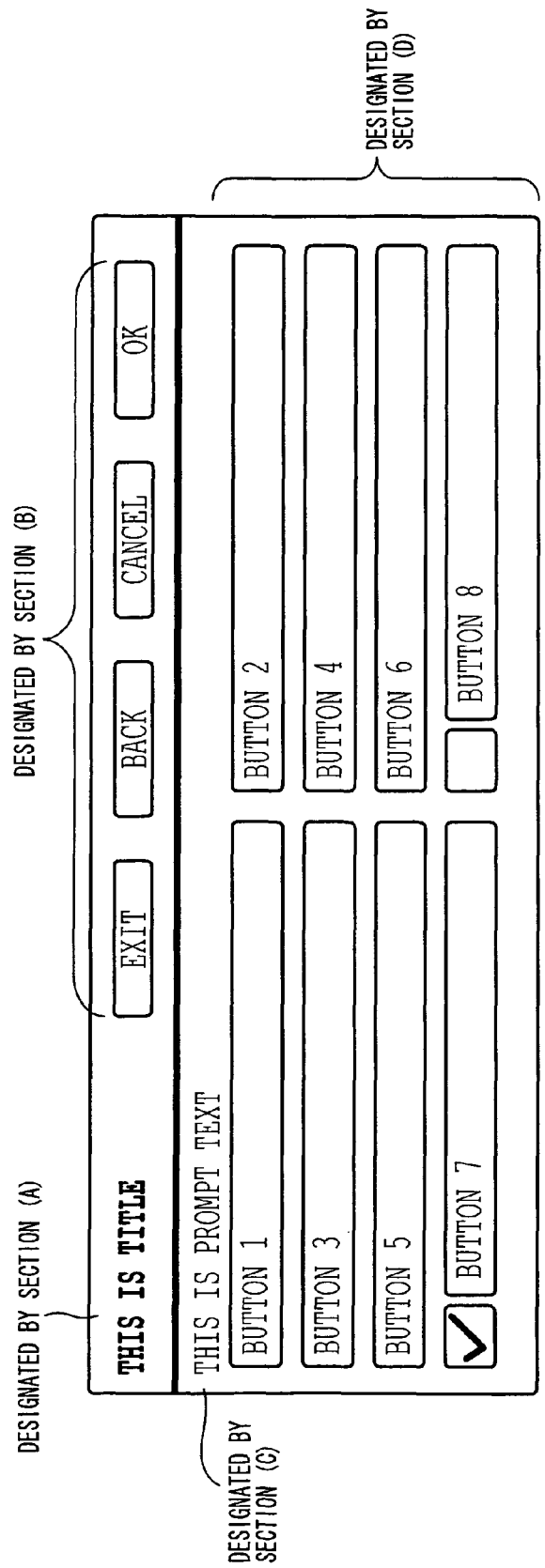
FIG. 31 relates to an embodiment of the present invention, and shows an example of an operation screen based on the UI data of FIG. 30.

Thereafter, the UI manager 16a causes the operation panel 6 to display an operation screen in accordance with the created UI data (S116). FIG. 31 is a diagram showing an operation screen that is based on the UI data of FIG. 30.

(Advantages of Present Embodiment and Modified Examples)

As described above, the multifunctional apparatuses 1 realizes a cooperation job by executing an appropriate combination of a plurality of elemental jobs such as a scan job, a print job, and a communication job. Moreover, the multifunctional apparatus 1 includes: a service layer 13 for executing the plurality of elemental jobs; an API table storage section (storage section provided in an Open I/F layer 19) for storing an API table that correlates, with a first control command for executing the cooperation job, a second control command acceptable to the service layer 13; and an Open I/F layer 19 for (i) accepting a first control command, (ii) specifying, from the API table, a second control command corresponding to the first control command, and (iii) outputting the specified second control command to the service layer 13.

As shown in FIG. 27, the service layer 13 is usually arranged so as to be unique to a single type of multifunctional apparatus 1. Therefore, the second control command acceptable to the service layer 13 varies depending on the type of multifunctional apparatuses 1.

However, according to the foregoing arrangement, the Open I/F layer 19 (i) accepts the first control command, (ii) specifies, from the API table, a second control command corresponding to the first control command, and (iii) outputs the specified second control command to the service layer 13. With this, even when the second control command depends on the type of multifunctional apparatuses 1, the Open I/F layer 19 sorts out the difference and hence the first control command can be made independent of the type of multifunctional apparatuses 1.

With this, in cases where the multifunctional apparatus 1 is controlled by an external control server 2 or 2', the control server 2 or 2' only needs to output, to the multifunctional apparatus 1, either a first control command independent of the type of multifunctional apparatuses 1 or a control instruction on which the first control command is based. This makes it easy to improve efficiency in development of the control server 2.

Furthermore, each of the multifunctional apparatuses 1 includes: a Web service layer 17 for accepting a control instruction from the control server 2 or 2' via a communication network; and an OSA application layer 18 for creating, in accordance with the control instruction accepted by the Web service layer 17, a first control command for executing the cooperation job, and for sending the created first control command to the Open I/F layer 19.

As described above, the first control command can be made common regardless of the type of multifunctional apparatus 1. Therefore, the OSA application layer 18 can also be arranged so as to be common regardless of the type of multifunctional apparatus 1. This improves efficiency in development of the multifunctional apparatus 1.

Further, in cases where an operation screen is used for controlling the OSA application layer 18, such operation screens can be made identical or similar regardless of the type of multifunctional apparatus 1. This is because the OSA application layer 18 does not depend on the type of multifunctional apparatus 1. As a result, users of different types of multifunctional apparatus 1 operate identical operation screens. This improves user-friendliness.

Since the OSA application layer 18 is independent of the type of the multifunctional apparatus 1, a control instruction that the OSA application layer 18 can accept is also independent of the type of the multifunctional apparatus 1. Therefore the control server 2 or 2' is not required to send different control instructions to the respective types of the multifunctional apparatuses 1. This facilitates the development of programs for the control servers 2 and 2'.

Furthermore, the API table is arranged such that, in cases where a plurality of second control commands are stored in the API table so as to be correlated with a single first control command, an order in which the plurality of second control commands are outputted is stored in the API table. The Open I/F layer 19 sequentially outputs the plurality of second control commands in accordance with the order.

In case of a cooperation job executed by combining a plurality of elemental jobs, the cooperation job cannot be properly realized without determining an appropriate order in which the elemental jobs are executed. However, according to the foregoing arrangement, the cooperation job can be properly realized since the plurality of second control commands are outputted in accordance with the order stored in the API table.

Furthermore, the multifunctional apparatus 1 includes: an operation panel 6; and a UI service layer (UI processing means) 16 for causing the operation panel 6 to display an operation screen. The UI service layer 16 (i) transmits, to the control server 2 or 2', transmission request information (request information) for requesting data of the operation screen, (ii) acquires the operation screen data from the control server 2 or 2' as a response to the transmission request information, and (iii) causes the operation panel 6 to display the operation screen that is based on the acquired operation screen data. Furthermore, the UI service layer 16 transmits, to the control server 2 or 2', information inputted to the operation screen.

Meanwhile, each of the control servers 2 and 2' includes: an information accepting section 231 for accepting the transmission request information from the multifunctional apparatus 1; a UI control section 233 for transmitting, to the multifunctional apparatus 1a or 1b, the operation screen data corresponding to the transmission request information accepted by the information accepting section 231; and a device control section 235 (i) for creating, in accordance with pressed-button information inputted to the operation screen, a control instruction for controlling the multifunctional apparatus 1a or 1b, and (ii) for transmitting the control instruction to the multifunctional apparatus 1a or 1b.

With this, the multifunctional apparatus 1 does not need to manage operation screen data of an operation screen, and only needs to request operation screen data of an operation from the control server 2 or 2' as needed. As a result, it is unnecessary to incorporate data of a new operation screen into the multifunctional apparatus 1, when the operation screen is changed. This makes it possible to do away with operations such as replacement of the substrate or ROM of the multifunctional apparatus 1.

Then, the UI service layer 16 transmits, to the control server 2 or 2', information inputted to the operation screen. This enables the device control section 235 of the control server 2 or 2' to create a control instruction in accordance with the information inputted to the operation screen.

Further, the operation screen data contains (i) screen style information (screen type information) indicating a screen format (screen style) of the operation screen and (ii) part type information indicating types of parts that constitute the operation screen. Moreover, the UI service layer 16 includes a screen table storage section (not shown) in which the screen style information and part display information indicating the locations and display formats of the image parts in the operation screen, displayed by the operation panel 6, whose screen format is indicated by the screen style information, are stored so as to be correlated with each other. The UI service layer 16 reads out, from the screen table storage section, part display information corresponding to the screen type information contained in the operation screen data acquired from the control server 2 or 2', creates an operation screen in accordance with the part display information and the part type information contained in the operation screen data acquired from the control server 2 or 2', and causes the display section to display the operation screen.

Therefore each of the control servers 2 and 2' is only required to create, independently of the type of multifunctional apparatus 1, operation screen data containing the screen type information and the part type information. This results in improved efficiency in development of the operation screen data.

MODIFIED EXAMPLE 1

In each of Embodiments 1 to 3 described above, each of the control servers 2 and 2' is arranged so as to control the execution of jobs of the multifunctional apparatus 1. However, the present invention is not limited to this. That is, each of the control servers 2 and 2' may be arranged so as to only send data of an authentication screen to the multifunctional apparatus 1 and lock and unlock the multifunctional apparatus 1. In this case, when the multifunctional apparatus 1a or 1b is unlocked, a user who has succeeded in authentication becomes able to cause the multifunctional apparatus 1 to freely execute a job within the scope of his/her execution authority. This modified example will be described below.

In this modified example, each of the multifunctional apparatuses 1a and 1b accepts and executes various jobs by using the user interface layer 11 and the application layer 12 instead of the UI service layer 16, the Web service layer 17, the OSA application layer 18, and the Open I/F layer 19.

Each of the control servers 2 and 2' operates in the same manner as it does between Step S201 of FIG. 6 and Step S235 of FIG. 8. After unlocking a multifunctional apparatus in Step S237, the device control section 235 of the control server 2 or 2' transmits only an authentication result and execution authority in Step S239. Meanwhile, the multifunctional apparatus 1, which has been unlocked and which has received the authentication result and the execution authority, accepts various job execution instructions from the user within the scope of the execution authority thus received. Then, the multifunctional apparatus 1, which has accepted a job execution instruction, executes a job autonomously without being controlled by the control server 2 or 2'.

Further, data of an operation screen (such as function selection screen and detail setting screen) that is displayed on the operation panel 6 in accepting a job execution instruction is not acquired as needed from the control server 2 or 2', but is selected for use from among those pieces of data stored in a storage section (not shown) by the multifunctional apparatus 1

Then, when the user logs out of the multifunctional apparatus 1, the multifunctional apparatus 1 asks the control server 2 or 2' to lock the multifunctional apparatus 1, and the control server 2 or 2' locks the multifunctional apparatus 1. As a result, the multifunctional apparatus 1 stops accepting a job execution instruction from the user. This prevents the user from causing the multifunctional apparatus 1 to execute a job.

Examples of cases where the user logs out of the multifunctional apparatus 1 include a case where the user explicitly gives a log-out instruction with use of the operation panel 6 of the multifunctional apparatus 1 and a case where a predetermined period of time has elapsed since the completion of a job.

Even the arrangement of such a modified example can solve the conventional problems described above.

MODIFIED EXAMPLE 2

In each of Embodiments 1 to 3 described above, each of the control servers 2 and 2' is arranged to control the operation of both the authentication information input device 7 and the multifunctional apparatus 1. However, the present invention is not limited to this. That is, each of the control servers 2 and 2' may be arranged to control only the operation of the authentication information input device 7, and the operation of the multifunctional apparatus 1 may be controlled by another server, e.g., by the authentication server 4 of Embodiment 2.

Figure 32:
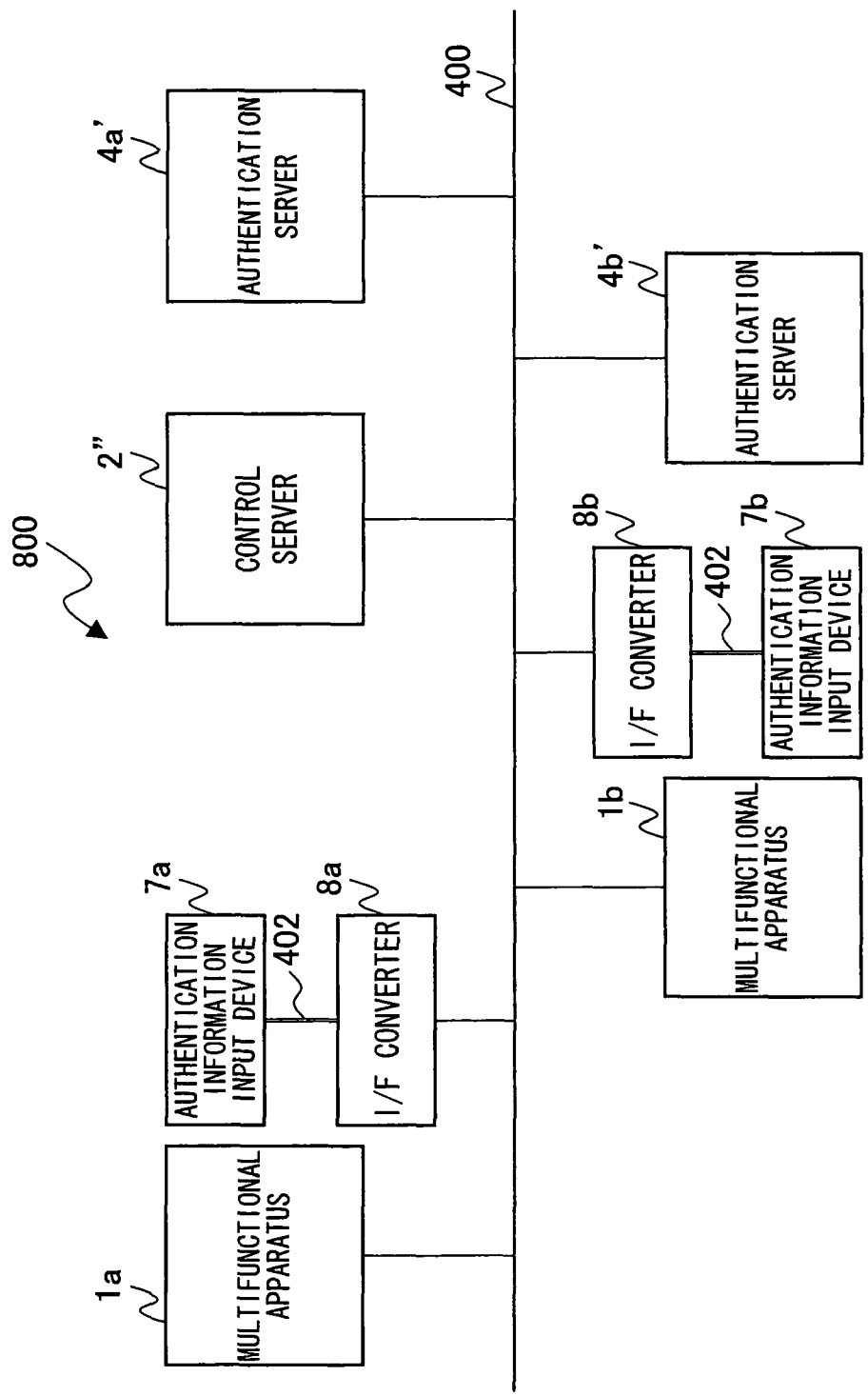
FIG. 32 shows a modified example of the present invention, and is a block diagram schematically showing an arrangement of a multifunctional apparatus control system.

FIG. 32 is a block diagram showing an arrangement of a multifunctional apparatus control system 800 of the present embodiment. The multifunctional apparatus control system 800 of the present embodiment is similar to the multifunctional apparatus control system 600 of Embodiment 2, and includes two authentication servers 4a' and 4b' in addition to two multifunctional apparatuses 1a and 1b, a single control server 2", two authentication information input devices 7a and 7b, and two I/F converters 8a and 8b.

In the present embodiment, the control server 2" locks the multifunctional apparatus 1 in the same manner as described above in Modified Example 1, but does not unlock the multifunctional apparatus 1. The authentication server 4' unlocks the multifunctional apparatus 1 in accordance with authentication results. For this purpose, the authentication server 4' includes a multifunctional apparatus control section (not shown) for unlocking the multifunctional apparatus 1.

The present embodiment is the same as Embodiment 2 to the extent that the control server 2" transmits, to the authentication server 4', authentication information acquired from a user by controlling the authentication information input device 7, and that the authentication server 4' authenticates the user in accordance with the authentication information thus received. However, the authentication server 4' then unlocks the multifunctional apparatus 1 in accordance with a result of the authentication. Then, the multifunctional apparatus 1, which has been unlocked, accepts various job execution instructions from the user within the scope of the execution authority of the user.

Even the arrangement of such a modified example can solve the conventional problems described above.

MODIFIED EXAMPLE 3

In the foregoing Embodiments 1-3, the authentication information input device 7 and the multifunctional apparatus 1 are independently connected to the network 400. The present invention, however, is not limited to this arrangement. For example, the authentication information input device 7 may be connected with the multifunctional apparatus 1.

Figure 33:
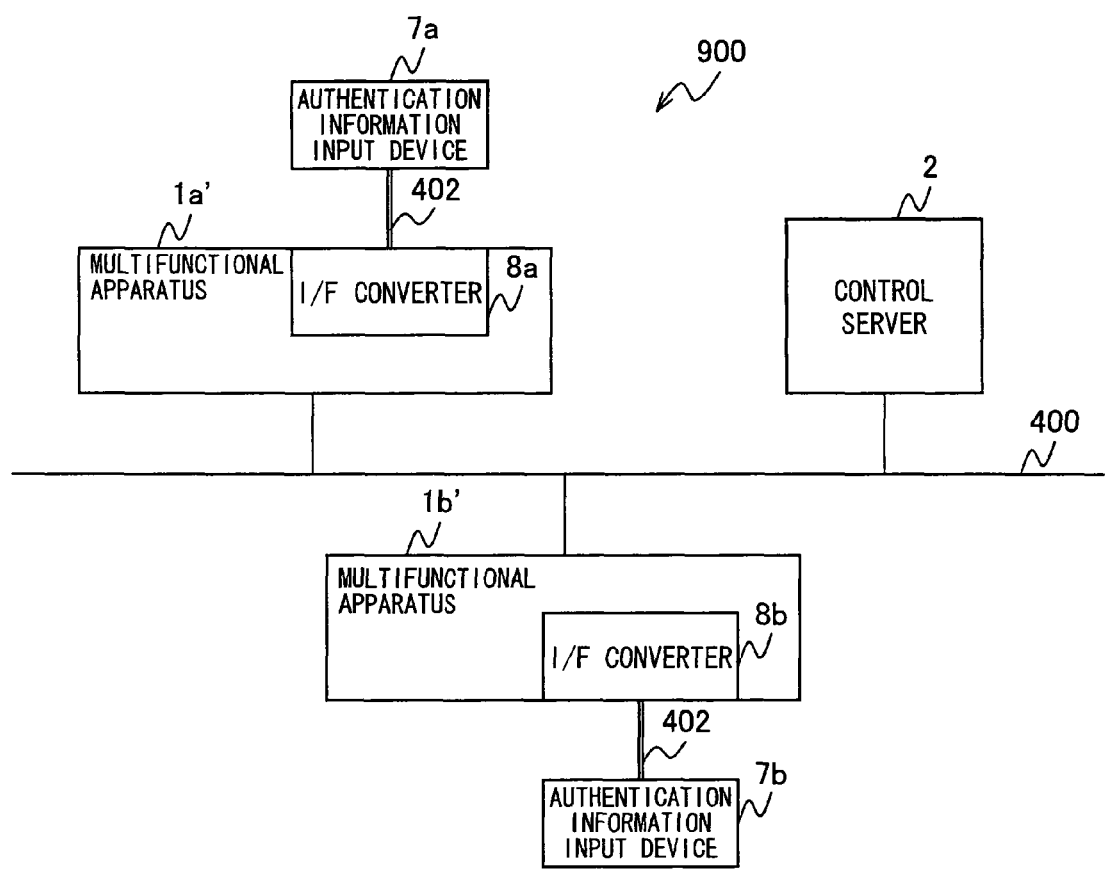
FIG. 33 shows another modified example of the present invention, and is a block diagram schematically illustrating an arrangement of a multifunctional apparatus control system.

FIG. 33 is a block diagram showing a multifunctional apparatus control system 900 of the present embodiment. The multifunctional apparatus control system 900 of the present embodiment includes two multifunctional apparatuses 1a' and 1b', a single control server 2, and two authentication information input devices 7a and 7b. The multifunctional apparatuses 1a' and 1b' and the control server 2 are connected with the network 400, whereas the authentication information input devices 7a and 7b are connected only with the multifunctional apparatuses 1a' and 1b', respectively.

The multifunctional apparatus 1' of the present embodiment is basically identical with the multifunctional apparatus 1 of Embodiment 1, except that the multifunctional apparatus 1' includes the I/F converter 8 of Embodiment 1. The authentication information input device 7 is connected to this I/F converter 8 in the multifunctional apparatus 1 by USB 402. As a result, the control server 2 can control the authentication information input device 7 via the network 400 and the multifunctional apparatus 1, in the substantially same manner as Embodiment 1. Therefore the above-discussed problem of the conventional arrangement is resolved by this modified example.

Lastly, the blocks (particularly driver invoking section 71, device identifying section 72, authenticating section 73, I/F converter driver 75, authentication information input device driver 77, and multifunctional apparatus control section 79) in the control servers 2, 2', and 2" and the blocks of the multifunctional apparatuses 1 and 1' may be realized by hardware logic. Alternatively, the blocks may be realized by software, with the use of a CPU as follows.

That is, the control servers 2, 2', and 2" and the multifunctional apparatuses 1 and 1' may include members such as: a CPU (Central Processing Unit) that executes instructions of a control program realizing the functions; a ROM (Read Only Memory) recording the program; a RAM (Random Access Memory) on which the program is executed; and a storage device (recording medium) such as a memory, which stores the program and various kinds of data. The objective of the present invention can be achieved in the following manner: program code (e.g. an executable code program, intermediate code program, and source program) of the control program of the control servers 2, 2', and 2" or the multifunctional apparatuses 1 and 1', the control program being software for realizing the functions, is recorded on a recording medium in a computer-readable manner, this recording medium is supplied to the control servers 2, 2', and 2" or the multifunctional apparatuses 1 and 1', and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card) and an optical card; and a semiconductor memory, such as a mask ROM, an EPROM (Erasable Programmable Read Only Memory), an EEPROM (Electrically Erasable Programmable Read Only Memory), or a flash ROM.

Alternatively, the control servers 2, 2', and 2" or the multifunctional apparatuses 1 and 1' may be capable of being connected to a communications network 400, allowing the program code to be supplied via the communications network 400. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized as a computer data signal embedded in a carrier wave, which is realized by electronic transmission of the program code.

The present invention may be used for, for example a system including a multifunctional apparatus which requires the authentication of the user before use.

As described above, a control apparatus of the present invention, which is able to communicate over a network with an imaging apparatus which includes a display section and executes a job including at least one of an image formation job and an image processing job, whether the imaging apparatus is permitted to execute the job being determined in accordance with an authentication result based on first authentication information that an authentication information acquisition device acquires from a user, includes: authentication screen transmitting means for transmitting, to the imaging apparatus over the network, data of an authentication screen which is displayed on the display section of the imaging apparatus and which prompts the user to make preparations to cause the authentication information acquisition device to acquire the first authentication information; device driver means for controlling the authentication information acquisition device over the network, so as to cause the authentication information acquisition device to acquire the first authentication information; authentication information receiving means for receiving, over the network, the first authentication information that the authentication information acquisition device has acquired; and permitting means for permitting the imaging apparatus to execute the job, in accordance with the authentication result based on the first authentication information that the authentication information receiving means has received.

Also, a control method of the present invention, for controlling, by a control apparatus over a network, (i) an authentication information acquisition device which acquires from a user first authentication information required for authentication and (ii) an imaging apparatus which includes a display section and executes a job including at least one of an image formation job and an image processing job, whether the imaging apparatus is permitted to execute the job being determined in accordance with an authentication result based on the first authentication information that the authentication information acquisition device acquires from the user, includes the steps of: (1) transmitting, by authentication screen transmitting means of the control apparatus, data of an authentication screen which is displayed on the display section of the imaging apparatus and which prompts the user to make preparations to cause the authentication information acquisition device to acquire the first authentication information, to the imaging apparatus over the network; (2) controlling, by device driver means of the control apparatus, the authentication information acquisition device over the network, so as to cause the authentication information acquisition device to acquire the first authentication information; (3) receiving over the network, by authentication information receiving means of the control apparatus, the first authentication information that the authentication information acquisition device has acquired; and (4) permitting, by permitting means of the control apparatus, the imaging apparatus to execute the job, in accordance with the authentication result based on the first authentication information that has been received in the step (3).

An imaging apparatus control system of the present invention includes the aforesaid imaging apparatus, the aforesaid authentication information acquisition device, and the aforesaid control apparatus.

It is noted that the aforesaid imaging apparatus and the aforesaid authentication information acquisition device may not communicate each other. Also, the aforesaid authentication information acquisition device may be connected to the imaging apparatus and exchange information with the control apparatus via the imaging apparatus.

Examples of the "image formation" include printing. Further, examples of the "image processing" include scanning of a document, facsimile, PC facsimile, image conversion, and image correction. Therefore, examples of the "imaging apparatus" include a printer, a copier, a facsimile machine, a PC facsimile machine, an image analysis apparatus, an image correction apparatus, a scanner, and a multifunctional apparatus.

According to the foregoing arrangement, the operation control means of the control apparatus controls the operation of the imaging apparatus via the network. Therefore, the imaging apparatus and the control apparatus that controls the operation of the imaging apparatus can be disposed in separate places. Meanwhile, the operation of the authentication information acquisition device is not controlled by the imaging apparatus as has conventionally been done, but is controlled by the device driver means of the control apparatus. In this way, the operation of the authentication information acquisition device is controlled by the control apparatus separate from the imaging apparatus which is designed to process a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

Furthermore, in cases where the authentication information acquisition device is connected to the control apparatus via a non-network manner such as USB thereby being controlled by the control apparatus, the control apparatus and the authentication information acquisition device must be located within a predetermined distance because of the constraints of the length of the cable, and hence the layout of the apparatuses is limited. On the other hand, in the arrangement above, since the authentication information acquisition device is controlled over the network, it is possible to arrange the control apparatus and the authentication information acquisition device to be remote from each other. This increases the freedom for the layout of apparatuses.

Furthermore, in the arrangement above, the data of the authentication screen us supplied from the authentication screen transmitting means of the control apparatus to the imaging apparatus, and the authentication screen corresponding to the data is displayed on the display section of the imaging apparatus. This authentication screen prompts the user to make preparations for causing the authentication information acquisition device to acquire the first authentication information. Therefore the user who sees the authentication screen displayed on the display section of the imaging apparatus notices that it is necessary to make preparations for causing the authentication information acquisition device to acquire the first authentication information, and hence makes the preparations. Therefore, even when the authentication information input device is not provided with a display section, it is possible to prompt the user to perform the preparations for authentication, by using the display section of the imaging apparatus. This makes it possible to construct a user-friendly authentication system. Moreover, when it is necessary to change the authentication screen because of an alternation in the arrangement of the authentication information acquisition device, it is unnecessary to replace a substrate or ROM of the imaging apparatus, because the data of the authentication screen is supplied from the control server. This further ensures the construction of a flexible authentication system.

Preferably, the authentication screen is arranged to not only prompt the user to make preparations but also explain in what manner the preparations are made. With this, the user can make preparations without confusion or doubt, irrespective of the type of the authentication information acquisition device.

Preferably, the authentication screen transmitting means generates and transmits the data of the authentication screen, in accordance with a type of the authentication information acquisition device that acquires the first authentication information.

In this arrangement, the authentication screen corresponding to the type of the authentication information acquisition device is displayed on the display section of the imaging apparatus. The user can therefore property make preparations corresponding to the type of the authentication information acquisition device.

In this case, it is possible to adopt an arrangement such that a screen data generation program storage section which stores a screen data generation program for generating the data of the authentication screen for respective types of authentication information acquisition devices is provided in the control apparatus, and the authentication screen transmitting means generates and transmits the data of the authentication screen corresponding to the type of the authentication information acquisition device that acquires the first authentication information, based on the screen data generation program corresponding to the type of the authentication information acquisition device that obtains the first authentication information. Alternatively, it is possible to adopt an arrangement such that an image data storage section storing sets of data of authentication screens corresponding to the respective types of authentication information acquisition devices is provided in the control apparatus, and the authentication screen transmitting means reads out, from the image data storage section, the data of the authentication screen corresponding to the type of the authentication information acquisition device that acquires the first authentication information, and transmits the data.

The control apparatus may be adapted so that the imaging apparatus further includes an input receiving section which receives input of second authentication information from the user, along with the preparations, the authentication screen transmitting means transmits, to the imaging apparatus, (i) data of an authentication screen which prompts the user to input the second authentication information to the input receiving section and (ii) instruction information which instructs the input receiving section to receive the input of the second authentication information from the user, the authentication screen transmitting means further receives, from the imaging apparatus, the second authentication information that the input receiving section has received, and the permitting means permits the imaging apparatus to execute the job, in accordance with the authentication result based on the first authentication information that the authentication information receiving means has received and the second authentication information that the authentication screen transmitting means has received.

In this arrangement, as authentication information for authentication, the second authentication information is obtained from the input receiving section of the imaging apparatus, and hence it is possible to perform the authentication based on the first authentication information and the second authentication information. For example, while an authentication information acquisition device which is an IC card reader reads out a user ID as the first authentication information from an IC card, an input receiving section of the imaging apparatus acquires a password as the second authentication information. It is therefore possible to perform authentication using both the user ID and the password. This makes it possible to carry out high-level authentication. Furthermore, since the second authentication information is acquired by the input receiving section of the imaging apparatus, no problem occurs even if the authentication information acquisition device is not provided with an input receiving section for receiving the second authentication information.

The control apparatus may be provided with switching means for switching between (i) a first authentication method in which the authentication information acquisition device acquires the first authentication information and the imaging apparatus is permitted to execute a job in accordance with an authentication result based solely on the first authentication information and (ii) a second authentication method in which the first authentication information and the second authentication information are acquired by the authentication information acquisition device and the imaging apparatus, respectively, and the imaging apparatus is permitted to execute a job in accordance with an authentication result based on the first authentication information and the second authentication information. This makes it possible to perform authentication suitable for the type of the authentication information acquisition device.

The control apparatus may be adapted so that the data of the authentication screen is described in a markup language, and the instruction information is included in the data of the authentication screen.

In this arrangement, since the data of the authentication screen is described in a markup language, the data of the authentication screen is abstract as compared to, for example, bitmap image data. Therefore it becomes easy to adapt the authentication screen to the properties (e.g. resolution and displayable colors) of the display section of the imaging apparatus. Furthermore, since the instruction information instructing the receipt of input of the second authentication information is included in the data of the authentication screen, it is possible to centrally manage the instruction information and the data defining the arrangement of the authentication screen. This makes it easy to manage data.

The control apparatus may be adapted to further include authenticating means for performing authentication of the user based on the first authentication information that the authentication information receiving means receives, the permitting means permitting the imaging apparatus to execute the job in accordance with a result of the authentication by the authenticating means.

In this case, preferably the control apparatus further includes a registration information storage section (e.g. user account database) storing registration information which is compared with the first authentication information that the authentication information acquisition device has acquired.

In the arrangement above, authentication based on the authentication information that the authentication information acquisition device has acquired is carried out by the authenticating means of the control apparatus. The imaging apparatus is therefore not required to perform the authentication, and hence it is unnecessary to replace a substrate and ROM of the imaging apparatus even if the type or the like of information required for the authentication is changed because of change in the arrangement of the authentication information acquisition device. This further ensures the construction of a flexible authentication system. Furthermore, the arrangement above is advantageous in that, when the control apparatus is connected with plural imaging apparatuses, the control apparatus can centrally manage the authentication information.

The control apparatus may be adapted to further include a corresponding server information storage section which stores correspondence information between the authentication information acquisition device and an authentication server which authenticates the user based on the first authentication information that the authentication information acquisition device acquires; authentication information transmitting means for transmitting, when the authentication information receiving means receives the first authentication information from the authentication information acquisition device, the first authentication information to the authentication server corresponding to the authentication information acquisition device which has transmitted the first authentication information to the authentication information receiving means, with reference to the correspondence information stored in the corresponding server information storage section; and authentication result receiving means for receiving a result of authentication of the user from the authentication server, the permitting means permitting the imaging apparatus to execute the job, in accordance with the result that the authentication result receiving means has received.

In this case, the authentication server may be provided with a registration information storage section (e.g. user account database) storing registration information which is compared with the first authentication information that the authentication information acquisition device has acquired.

In the arrangement above, authentication based on the authentication information that the authentication information acquisition device has acquired is carried out by the authentication server. The imaging apparatus is therefore not required to perform the authentication, and hence it is unnecessary to replace a substrate and ROM of the imaging apparatus even if the type or the like of information required for the authentication is changed because of change in the arrangement of the authentication information acquisition device. This further ensures the construction of a flexible authentication system. Furthermore, since the authentication is carried out by the authentication server, it is possible to reduce the burden on the control apparatus as compared to a case where the control apparatus performs authentication.

Furthermore, in the arrangement above, the first authentication information that the authentication information acquisition device has acquired is sent to the authentication server corresponding to the type of the authentication information acquisition device, by the authentication information transmitting means. It is therefore possible to distribute the burden of authentication to plural authentication servers, in accordance with the types of the authentication information acquisition devices This makes it possible to prevent a single authentication server from bearing heavy burden.

The control apparatus is preferably adapted to further include a corresponding imaging apparatus information storage section which stores correspondence information between the authentication information acquisition device and the imaging apparatus which is permitted to execute the job in accordance with the authentication result based on the first authentication information that the authentication information acquisition device has acquired, the permitting means permitting to execute the job, based on the correspondence information stored in the corresponding imaging apparatus information storage section, the imaging apparatus which corresponds to the authentication information acquisition device which has transmitted the first authentication information to the authentication information receiving means.

In this arrangement, the correspondence information stored in the corresponding imaging apparatus information storage section indicates the correspondence relationship between the authentication information acquisition device and the imaging apparatus which is permitted to execute a job when the authentication using the first authentication acquired by that authentication information acquisition device. Therefore, it is possible to freely associate any authentication information acquisition device acquiring first authentication information with any imaging apparatus which is permitted to execute a job, even if, for example, the imaging apparatus control system includes plural imaging apparatuses or the imaging apparatus control system includes plural authentication information acquisition devices.

The control apparatus may be adapted so that the control apparatus is connected to plural imaging apparatuses over the network, and the permitting means permits each of the imaging apparatuses to execute a job in accordance with an authentication result based on the authentication information that the authentication information receiving means receives, and the permitting means instructs the imaging apparatus which is permitted to execute the job, to notify the user that execution of the job is possible.

In the arrangement above, plural imaging apparatuses are permitted to execute jobs, as a result of authentication. This arrangement is suitable for a case where a job which requires simultaneous use of plural imaging apparatuses is executed. Furthermore, the user is notified that an imaging apparatus becomes ready to execute a job. Therefore, when there are plural imaging apparatuses, the user can promptly know which imaging apparatus becomes ready to use.

The control apparatus may be adapted so that the authentication information acquisition device is able to communicate with the control apparatus via an interface converter, the authentication information acquisition device is connected with the interface converter via a communication path, whereas the interface converter is connected with the control apparatus over the network, the device driver means includes: command generating means for generating first packet data in which a control instruction by which the authentication information acquisition device is controlled is written based on a communication protocol of the communication path; packet converting means for generating second packet data which includes the control instruction and is transmittable over the network, the second packet data being generated by adding header information required for communications over the network to the first packet data generated by the command generating means; and command transmitting means for transmitting the second packet data generated by the packet converting means to the interface converter, over the network, the interface converter converting the second packet data supplied from the command transmitting means into the first packet data, and transmitting the first packet data to the authentication information acquisition device via the communication path.

Many commercially-available authentication information acquisition devices are not network-connectable, for example, only support USB connection. Such an authentication information acquisition device may be directly connected to the control apparatus by USB or the like. However, because of the restraint of the cable length, the control apparatus and the authentication information acquisition device must be located within a predetermined distance. This puts restrictions on the layout of apparatuses.

In the arrangement above, the device driver means of the control apparatus can control the authentication information acquisition device via a network-connectable interface converter. This allows a control apparatus to control a commercially-available authentication information acquisition device which is not network-connectable and is far from the control apparatus. It is therefore possible to freely arrange the layout of apparatuses. As a result, for example, the authentication information acquisition device and the imaging apparatus may be placed side by side and controlled by a control apparatus placed far from them.

The control apparatus is preferably adapted to further include a computer; a driver program storage section which stores, for each type of the authentication information acquisition device, a device driver program for controlling the authentication information acquisition device; a corresponding driver information storage section which stores correspondence information between the authentication information acquisition device and the device driver program for controlling the authentication information acquisition device; and driver invoking means for causing the computer to function as the device driver means, by invoking, with reference to the correspondence information stored in the corresponding driver information storage section, the device driver program corresponding to the authentication information acquisition device that acquires the first authentication information and causing the computer to execute the device driver program, the authentication information acquisition device being controlled in such a way that the computer executes the device driver program invoked by the driver invoking means.

In this arrangement, when there are plural authentication information acquisition devices and these devices are controlled by different programs, the driver invoking means selects and activates a device driver program suitable for the authentication information acquisition device to be controlled. It is therefore possible to suitably control the devices, irrespective of the type of the authentication information acquisition device.

The control apparatus may be adapted to further include determining means for determining whether the preparations for acquisition of the first authentication information by the authentication information acquisition device have been done, before the authentication screen transmitting means transmits the data of the authentication screen, if the determining means determines that the preparations have been done, the authentication screen transmitting means refraining from transmitting the data of the authentication screen.

The arrangement above makes it possible to avoid user's confusion that the user is prompted to make preparations even if the authentication information acquisition device has already completed the preparation to acquire information.

The control apparatus is preferably adapted to further include job control means for receiving, from the imaging apparatus over the network, job information indicating a type of a job that the imaging apparatus has received from the user, and transmitting, to the imaging apparatus over the network, a control command which instructs the imaging apparatus to execute the job indicated by the job information.

In the arrangement above, job information that the imaging apparatus has received is sent to the control apparatus, and then a job execution instruction is supplied from the control apparatus to the imaging apparatus. This allows the control apparatus to manage the statistics of the use of the imaging apparatus or the like. Furthermore, in case where the imaging apparatus control system includes plural imaging apparatuses, jobs of plural imaging apparatuses can be centrally managed by the control apparatus.

The control apparatus may be realized as hardware or realized by causing a computer to execute a program. More specifically, a program of the present invention causes a computer to function as the aforesaid means of the control apparatus, and a storage medium of the present invention stores this program.

A computer executing this program functions as the means of the control apparatus. It is therefore possible to achieve the effects similar to those of the aforesaid control apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control apparatus which is able to communicate over a network with a plurality of imaging apparatuses and a plurality of authentication information acquisition devices, which plurality of imaging apparatuses include respective display sections and execute respective jobs each including at least one of an image formation job and an image processing job, whether any of the plurality of imaging apparatuses is permitted to execute the job being determined in accordance with an authentication result based on first authentication information acquired from a user by one of the plurality of authentication information acquisition devices which one of the plurality of authentication information acquisition devices corresponds to any of the plurality of imaging apparatuses, the control apparatus comprising:

a corresponding imaging apparatus information storage section which stores correspondence information between the plurality of authentication information acquisition devices and the plurality of imaging apparatuses any of which is permitted to execute the job in accordance with the authentication result based on the first authentication information that the corresponding one of the plurality of authentication information acquisition devices has acquired;

authentication screen transmitting means for transmitting, to any of the plurality of imaging apparatuses over the network, data of an authentication screen which is displayed on the display section of any of the plurality of imaging apparatuses and which prompts the user to make preparations to cause a corresponding one of the plurality of authentication information acquisition, devices to acquire the first authentication information;

control means for controlling any of the plurality of authentication information acquisition devices over the network, so as to cause any of the plurality of authentication information acquisition devices to acquire the first authentication information;

authentication information receiving means for receiving, over the network, the first authentication information that any of the plurality of authentication information acquisition devices has acquired; and permitting means for permitting any of the plurality of imaging apparatuses to execute the job, in accordance with the authentication result based on the first authentication information that the authentication information receiving means has received~said any of the plurality of imaging apparatuses which is permitted by the permitting means to execute the job corresponding to, in the correspondence information stored in the corresponding imaging apparatus information storage section, a one of the plurality of authentication information acquisition devices which has transmitted the first authentication information to the authentication information receiving means.

2. The control apparatus as defined in claim 1, wherein, the authentication screen transmitting means generates and transmits the data of the authentication screen, in accordance with a type of the authentication information acquisition device that acquires the first authentication information.

3. The control apparatus as defined in claim 1, wherein, the imaging apparatus further includes an input receiving section which receives input of second authentication information from the user, along with the preparations, the authentication screen transmitting means transmits, to the imaging apparatus, (i) data of an authentication screen which prompts the user to input the second authentication information to the input receiving section and (ii) instruction information which instructs the input receiving section to receive the input of the second authentication information from the user, the authentication screen transmitting means further receives, from the imaging apparatus, the second authentication information that the input receiving section has received, and the permitting means permits the imaging apparatus to execute the job, in accordance with the authentication result based on the first authentication information that the authentication information receiving means has received and the second authentication information that the authentication screen transmitting means has received.

4. The control apparatus as defined in claim 3, wherein, the data of the authentication screen is described in a markup language, and the instruction information is included in the data of the authentication screen.

5. The control apparatus as defined in claim 1, further comprising authenticating means for performing authentication of the user based on the first authentication information that the authentication information receiving means receives, the permitting means permitting the imaging apparatus to execute the job in accordance with a result of the authentication by the authenticating means.

6. The control apparatus as defined in claim 1, further comprising:

a corresponding server information storage section which stores correspondence information between the authentication information acquisition device and an authentication server which authenticates the user based on the first authentication information that the authentication information acquisition device acquires;

authentication information transmitting means for transmitting, when the authentication information receiving means receives the first authentication information from the authentication information acquisition device, the first authentication information to the authentication server corresponding to the authentication information acquisition device which has transmitted the first authentication information to the authentication information receiving means, with reference to the correspondence information stored in the corresponding server information storage section; and authentication result receiving means for receiving a result of authentication of the user from the authentication server, the permitting means permitting the imaging apparatus to execute the job, in accordance with the result that the authentication result receiving means has received.

7. The control apparatus as defined in claim 1, wherein, the control apparatus is connected to plural imaging apparatuses over the network, and the permitting means permits each of the imaging apparatuses to execute a job in accordance with an authentication result based on the authentication information that the authentication information receiving means receives, and the permitting means instructs the imaging apparatus which is permitted to execute the job, to notify the user that execution of the job is possible.

8. The control apparatus as defined in claim 1, wherein, the authentication information acquisition device is able to communicate with the control apparatus via an interface converter, the authentication information acquisition device is connected with the interface converter via a communication path, Whereas the interface converter is connected with the control apparatus over the network, the control means includes:
- command generating means for generating first packet data in which a control instruction by which the authentication information acquisition device is controlled is written based on a communication protocol of the communication path;
- packet converting means for generating second packet data which includes the control instruction and is transmittable over the network, the second packet data being generated by adding header information required for communications over the network to the first packet data generated by the command generating means; and
- command transmitting means for transmitting the second packet data generated by the packet converting means to the interface converter, over the network, the interface converter converting the second packet data supplied from the command transmitting means into the first packet data, and transmitting the first packet data to the authentication information acquisition device via the communication path.

9. The control apparatus as defined in claim 1, further comprising:
- a computer;
- a driver program storage section which stores, for each type of the authentication information acquisition device, a device driver program for controlling the authentication information acquisition device;
- a corresponding driver information storage section which stores correspondence information between the authentication information acquisition device and the device driver program for controlling the authentication information acquisition device; and
- driver invoking means for causing the computer to function as the control means, by invoking, with reference to the correspondence information stored in the corresponding driver information storage section, the device driver program corresponding to the authentication information acquisition device that acquires the first authentication information and causing the computer to execute the device driver program, the authentication information acquisition device being controlled in such a way that the computer executes the device driver program invoked by the driver invoking means.

10. The control apparatus as defined in claim 1, further comprising determining means for determining whether the preparations for acquisition of the first authentication information by the authentication information acquisition device have been done, before the authentication screen transmitting means transmits the data of the authentication screen, if the determining means determines that the preparations have been done, the authentication screen transmitting means refraining from transmitting the data of the authentication screen.

11. The control apparatus as defined in claim 1, further comprising job control means for receiving, from the imaging apparatus over the network, job information indicating a type of a job that the imaging apparatus has received from the user, and transmitting, to the imaging apparatus over the network, a control command which instructs the imaging apparatus to execute the job indicated by the job information.

12. The control apparatus as defined in claim 1, wherein, the authentication information acquisition device is connected with the imaging apparatus and exchanges information with the-control apparatus via imaging apparatus.

13. A non-transitory computer-readable storage medium storing a program for causing a computer to function as a control apparatus that is able to communicate over a network with an imaging apparatus a plurality of imaging apparatuses and a plurality of authentication information acquisition devices, which plurality of imaging apparatuses include respective display sections and execute respective jobs each which a display section and execute~a job including at least one of an image formation job and an image processing job, whether the imaging apparatus any of said plurality of imaging apparatuses is permitted to execute the job being determined in accordance with an authentication result based on first authentication information acquired from a user by one of said plurality of authentication information acquisition devices which one of said plurality of authentication information acquisition devices corresponds to any of the plurality of imaging apparatuses, the control apparatus comprising:
- a corresponding image apparatus information storage section which stores correspondence information between said plurality of authentication information acquisition devices and said plurality of imaging apparatuses any of which is permitted to execute the job in accordance with the authentication result based on the first authentication information that the corresponding one of the plurality of authentication information acquisition devices has acquired;
- authentication screen transmitting means for transmitting, to any of said plurality of imaging apparatuses over the network, data of an authentication screen which is displayed on the display section of any of said plurality of imaging apparatuses and which prompts the user to make preparations to cause a corresponding one of said plurality of authentication information acquisition devices to acquire the first authentication information;
- control means for controlling the any of said plurality of authentication information acquisition devices over the network, so as to cause the any of said plurality of authentication information acquisition devices to acquire the first authentication information;
- authentication information receiving means for receiving, over the network, the first authentication information that the any of said plurality of authentication information acquisition devices has acquired; and
- permitting means for permitting any of said plurality of imaging apparatuses to execute the job, in accordance with the authentication result based on the first authentication information that the authentication information receiving means has received said any of said plurality of imaging apparatuses which is permitted by the permitting means to execute the job corresponding to, in the correspondence information stored in the corresponding imaging apparatus information storage section, a one of said plurality of authentication information acquisition devices which has transmitted the first authentication information to the authentication information receiving means.

14. An imaging apparatus control system comprising:
(i) a control apparatus
(ii) a plurality of imaging apparatuses;
(iii)a plurality of authentication information acquisition devices;
wherein said control apparatus is able to communicate over a network said plurality of imaging apparatuses and said plurality of authentication information acquisition devices, each of which plurality of imaging apparatuses includes a respective display section and executes respective jobs each and executing a job including at least one of an image formation job and an image processing job, whether any of said plurality of imaging apparatuses the imaging apparatus is permitted to execute the job being determined in accordance with an authentication result based on first authentication information that an authentication information acquisition device acquires from a user acquired from a user by one of said plurality of authentication information acquisition devices which one of said plurality of authentication information acquisition devices corresponds to one of said plurality of imaging apparatuses, and the control apparatus comprises:
a corresponding imaging apparatus information storage section which stores correspondence information between said plurality of authentication information acquisition devices and said plurality of imaging apparatuses any of which is permitted to execute the job in 4 accordance with the authentication result based on the first authentication information that the corresponding one of the plurality of authentication information acquisition devices has acquired;
authentication screen transmitting means for transmitting, any of said plurality of imaging apparatuses over the network, data of an authentication screen which is displayed on the display section of any said plurality of imaging apparatuses and which prompts the user to make preparations to cause a corresponding one of said plurality of authentication information acquisition devices to acquire the first authentication information;
control means for controlling any of said plurality of authentication information acquisition devices over the network, so as to cause any of said plurality of authentication information acquisition devices to acquire the first authentication information;
authentication information receiving means for receiving, over the network, the first authentication information that any of said plurality of authentication information acquisition devices has acquired;
and permitting means for permitting any of said plurality of imaging apparatuses to execute the job, in accordance with the authentication result based on the first authentication information that the authentication information receiving means has received said any of said plurality of imaging apparatuses which is permitted by the permitting means to execute the job corresponding to, in the correspondence information stored in the corresponding imaging apparatus information storage section, a one of said plurality of authentication information acquisition devices which has transmitted the first authentication information to the authentication information receiving means.

15. A control method for controlling, by a control apparatus over a network, a plurality of authentication information acquisition devices that acquire from a user first authentication information required for authentication and (ii a plurality of imaging apparatuses that each includes a display section and executes respective jobs including at least one of an image formation job and an image processing job, wherein whether the any of said plurality of imaging apparatuses is permitted to execute the job is determined in accordance with an authentication result based on the first authentication information acquired from a user by one of said plurality of authentication information acquisition devices which one of said plurality of authentication information acquisition devices corresponds to any of said plurality of imaging apparatuses that the authentication information acquisition device acquires from the user, said control method comprising the steps of:
(1) storing in a corresponding imaging information storage section correspondence information between said plurality of authentication information acquisition devices and said plurality of imaging devices any of which is permitted to execute the job in accordance with the first authentication information that the corresponding one of the plurality of authentication information acquisition devices has acquired;
transmitting, by authentication screen transmitting means of the control apparatus, data of an authentication screen which is displayed on the display section of the any of said plurality of imaging apparatuses and which prompts the user to make preparations to cause a corresponding one of said plurality of authentication information acquisition devices to acquire the first authentication information, to any of said plurality of imaging apparatuses over the network;
(2) controlling, by control means of the control apparatus, any of said plurality of authentication information acquisition devices over the network, so as to cause any of said plurality of authentication information acquisition devices to acquire the first authentication information;
(3) receiving over the network, by authentication information receiving means of the control apparatus, the first authentication information that the any of said plurality of authentication information acquisition devices has acquired; and
(4) permitting, by permitting means of the control apparatus, the any of said plurality of imaging apparatuses to execute the job, in accordance with the authentication result based on the first authentication information that has been received in the step (3);
wherein said any of said plurality of imaging apparatuses which is permitted by the permitting means to execute the job corresponding to, in the correspondence information stored in the corresponding imaging information apparatus storage section, a one of said plurality of authentication information acquisition devices which has transmitted the first authentication information to the authentication information receiving means.

* * * * *